US009363576B2

(12) United States Patent
Schraga

(10) Patent No.: US 9,363,576 B2
(45) Date of Patent: Jun. 7, 2016

(54) ADVERTISEMENT INSERTION SYSTEMS, METHODS, AND MEDIA

(71) Applicant: Steven Schraga, Surfside, FL (US)

(72) Inventor: Steven Schraga, Surfside, FL (US)

(*) Notice: Subject to any disclaimer, the term of this patent is extended or adjusted under 35 U.S.C. 154(b) by 0 days.

(21) Appl. No.: 14/218,132

(22) Filed: Mar. 18, 2014

(65) Prior Publication Data

US 2014/0201770 A1 Jul. 17, 2014

Related U.S. Application Data

(63) Continuation-in-part of application No. 14/035,421, filed on Sep. 24, 2013, now Pat. No. 9,038,098, which is a continuation of application No. 11/621,655, filed on Jan. 10, 2007, now Pat. No. 8,572,642.

(51) Int. Cl.
| H04N 7/10 | (2006.01) |
| H04N 7/025 | (2006.01) |
| H04N 21/81 | (2011.01) |
| H04N 21/435 | (2011.01) |
| H04N 21/442 | (2011.01) |
| H04N 21/414 | (2011.01) |
| G11B 27/036 | (2006.01) |
| H04N 7/173 | (2011.01) |
| H04N 21/234 | (2011.01) |
| H04N 21/2743 | (2011.01) |
| H04N 21/4223 | (2011.01) |
| H04H 60/37 | (2008.01) |
| H04H 20/10 | (2008.01) |
| H04H 60/48 | (2008.01) |

(52) U.S. Cl.
CPC ............ *H04N 21/812* (2013.01); *G11B 27/036* (2013.01); *H04H 20/10* (2013.01); *H04H 60/375* (2013.01); *H04H 60/48* (2013.01); *H04N 7/17318* (2013.01); *H04N 21/23412* (2013.01); *H04N 21/2743* (2013.01); *H04N 21/41422* (2013.01); *H04N 21/4223* (2013.01); *H04N 21/435* (2013.01); *H04N 21/44213* (2013.01)

(58) Field of Classification Search
USPC ...................................................... 725/32–36
See application file for complete search history.

(56) References Cited

U.S. PATENT DOCUMENTS

| 4,731,743 A | 3/1988 | Biancato |
| 4,872,056 A | 10/1989 | Hicks et al. |
| 5,117,283 A | 5/1992 | Kroos et al. |
| 5,233,423 A | 8/1993 | Jernigan et al. |

(Continued)

OTHER PUBLICATIONS

JibJab Sendables eCards, JibJab Media Inc., Jul. 18, 2008, retrieved from http://replay.waybackmachine.org/20080718012128/http://sendables.jibjab.com/.

(Continued)

*Primary Examiner* — Nasser Goodarzi
*Assistant Examiner* — Fred Peng
(74) *Attorney, Agent, or Firm* — Greenblum & Bernstein, P.L.C.

(57) ABSTRACT

Systems, methods, and media for providing an advertisement in correspondence with a radio broadcast are provided. A radio broadcast receiver receives the radio broadcast. An audio output outputs the radio broadcast as an audio signal. A display controller determines an advertisement for display in correspondence with the audio signal. A display is configured to display the advertisement, and a processor controls a movement within the advertisement during the display of the advertisement on the display. The movement is controlled in accordance with a speed of motion determined by the processor.

20 Claims, 10 Drawing Sheets

(56) References Cited

U.S. PATENT DOCUMENTS

| | | | |
|---|---|---|---|
| 5,491,517 A | 2/1996 | Kreitman et al. | |
| 5,854,897 A * | 12/1998 | Radziewicz et al. | 709/224 |
| 5,917,553 A | 6/1999 | Honey et al. | |
| 6,177,931 B1 | 1/2001 | Alexander et al. | |
| 6,624,843 B2 | 9/2003 | Lennon | |
| 6,857,131 B1 | 2/2005 | Yagawa et al. | |
| 7,015,978 B2 | 3/2006 | Jeffers et al. | |
| 7,154,383 B2 * | 12/2006 | Berquist | 340/425.5 |
| 7,752,642 B2 | 7/2010 | Lemmons | |
| 7,912,219 B1 | 3/2011 | Michener et al. | |
| 2002/0080279 A1 | 6/2002 | Wang et al. | |
| 2002/0090133 A1 | 7/2002 | Kim et al. | |
| 2003/0030658 A1 | 2/2003 | Gibbs et al. | |
| 2004/0068439 A1 * | 4/2004 | Elgrably | 705/14 |
| 2004/0100556 A1 | 5/2004 | Stromme | |
| 2004/0109087 A1 | 6/2004 | Robinson et al. | |
| 2004/0194128 A1 | 9/2004 | McIntyre et al. | |
| 2006/0026628 A1 | 2/2006 | Wan et al. | |
| 2007/0226761 A1 | 9/2007 | Zalewski et al. | |
| 2010/0121703 A1 * | 5/2010 | Goto et al. | 705/14.41 |
| 2013/0312029 A1 | 11/2013 | Huber et al. | |
| 2014/0040016 A1 * | 2/2014 | Amla et al. | 705/14.45 |
| 2015/0025975 A1 * | 1/2015 | Wallach | 705/14.63 |
| 2015/0032541 A1 * | 1/2015 | Haddad et al. | 705/14.57 |

OTHER PUBLICATIONS

Hallmark Augmented Reality Webcam Greetings, Peanuts Worldwide LLC, 2010, available at http://www.hallmark.com/online/webcam-greetings.aspx (accessed on Apr. 7, 2011).

"Hallmark will introduce 'augmented reality' greeting cards", Kansas City Business Journal, Jan. 12, 2010, available at http://www.bizjournals.com/kansascity/stories/2010/01/11/daily16.html (last modified Jan. 12, 2010).

* cited by examiner

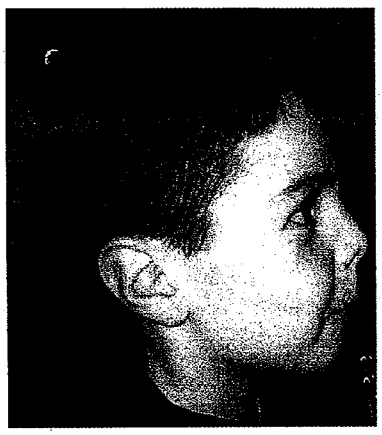
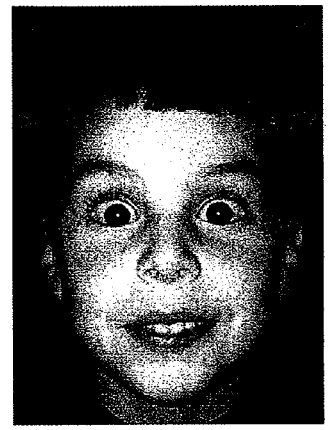
FIG. 5A          FIG. 5B          FIG. 5C
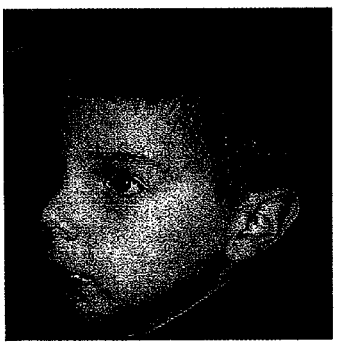
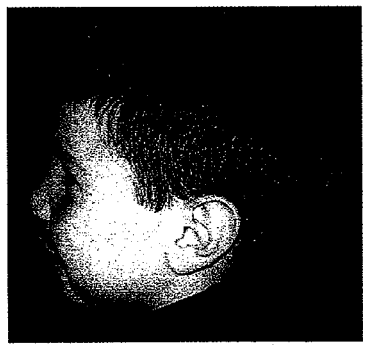
FIG. 5D          FIG. 5E          FIG. 5F

ADVERTISEMENT INSERTION SYSTEMS, METHODS, AND MEDIA

CROSS-REFERENCE TO RELATED APPLICATIONS

The present application is a continuation-in-part application of U.S. patent application Ser. No. 14/035,421, filed Sep. 24, 2013, which is a continuation application of U.S. patent application Ser. No. 11/621,655, filed Jan. 10, 2007. The disclosures of these documents, including the specifications, drawings, and claims, are incorporated herein by reference in their entireties.

BACKGROUND

1. Field of the Disclosure

The present invention relates to the field of communications. More particularly, the present invention relates to gathering, managing and inserting customized advertisement information in communication systems.

2. Background Information

User expectation has continued to grow concurrently with the advent of new technologies. Expectations for greater and more personalized services have developed in a variety of service industries with respect to inserting images or other visual information into another displayed image, replacing at least a portion of that display image. For example, U.S. Pat. No. 4,731,743 to BLANCATO describes a "Method and Apparatus for Displaying Hairstyles." In an effort to provide a user with a preview of how a particular hairstyle will appear on the user, i.e., without having to go through the actual haircut and hairstyling, BLANCATO stores a plurality of hairstyles on a disc associated with a computer. Subsequently, BLANCATO captures an image of the user and outlines the user's face. He then makes a number of modifications to the image, including overlaying particular hairstyles. BLANCATO then displays the overlayed image to the user for hairstyle assessment.

U.S. Pat. No. 6,624,843 to LENNON, entitled "Customer Image Capture and Use Thereof in a Retailing System," describes an image capture system used in a retailing environment. Particularly, LENNON describes a system that captures an image of a customer at a retailer's place of business. Subsequently, when the customer is in close proximity to an image display area within the retailer's place of business, a composite image including the customer's captured image and a reference image may be provided. The composite image may include full motion video or still images. Thus, a customer is provided with an opportunity to virtually assess particular merchandise without having to try on, for example, an apparel item.

U.S. Pat. No. 7,015,978 to JEFFERS et al., entitled "System And Method For Real Time Insertion Into Video With Occlusion On Areas Containing Multiple Colors," describes real-time insertion of indicia such as, for example, an advertisement, into a live or taped broadcast. JEFFERS et al. provide for insertion of indicia onto surfaces such as tennis courts, walls, grass or turf surfaces, or other surfaces shown during televised sporting events. To accomplish indicia insertion, JEFFERS et al. obtain video images from a camera, digitize the images, sample the digitized images into sampled pixels, and obtain a plurality of background colors for the sampled pixels. JEFFERS et al. then assign an opacity value to each pixel in the indicia based on whether the color of a positionally corresponding pixel in the video image is the same color as one of the plurality of background colors. Pixels are then displayed in the video image in dependence on whether the positionally corresponding pixel in the video image is the same color as one of the background colors.

Progress in computer processor speeds has significantly expanded the possible applications. It is not uncommon for ordinary personal computers to possess microprocessors that operate at clock cycles of 3.8 GHz or higher. Moreover, storage capacity has increased dramatically, where it is not uncommon to find ordinary personal computers that possess 200 Gigabyte hard-drives, which may be further expanded without any clearly defined limit.

A need exists for customized signal insertion and/or overlay in telecommunications systems, such as, for example, television and radio broadcasts. Particularly, a need exists for customized insertion and/or overlay of user defined images, sounds and other indicia in received signals on electronic devices such as, for example, televisions, computers, telephones, personal data assistants (PDAs), portable computers, radios, satellite receivers, and the like.

SUMMARY OF THE DISCLOSURE

According to an aspect of the invention, an image insertion apparatus is provided for inserting a model object into at least one program. The object may comprise an image, a sound, or a combination of an image and a sound. The object insertion apparatus may be provided at a user site, a transmitter site, or a combination of the user site and transmitter site. The program may comprise a multimedia content signal that may be transmitted from the user site, the transmitter site, or a combination of the user site and transmitter site.

The object insertion apparatus includes a memory, a selector, a communicator and an inserter. The memory stores one or more model objects. The selector receives a selection of the one or more model objects and a selection of one or more categories of program. At least one of the categories of program includes the at least one program.

The communicator provides communication between the object insertion apparatus and a user. The communicator is configured to receive the selected one or more model objects and the selected one or more categories of program. The selected one or more model objects are provided to the inserter, which inserts and/or overlays the selected one or more model objects into the at least one program based on the selected one or more categories of program.

The object insertion apparatus further includes an object extractor, a feature extractor, an object processor, an encryptor, an encoder, a format converter, a decryptor, and a decoder. The decryptor decrypts a received multimedia signal, including the at least one program, when the received signal is determined to be encrypted. The decoder decodes the received multimedia signal, including the at least one program, and outputs a decoded multimedia signal. The decoded multimedia signal is provided to the format converter, which converts the decoded multimedia signal to a base composite signal, including the at least one program. The base composite signal includes an object field signal and an audio signal, where the object field signal and the audio signal may be the at least one program.

The object field signal is provided to the extractor, which extracts a portion of the object field signal from the at least one program. The object extractor generates a histogram for the extracted portion of the object field signal by transforming the extracted portion of the object field signal from a time domain to a frequency domain. The extracted portion of the object field signal is provided to the feature extractor, which extracts a feature from the extracted portion of the object field signal. The feature extractor generates at least one motion vector for the extracted portion of the object field signal. The extracted portion of the object field signal and the extracted feature from the extracted portion of the object field signal are provided to the object processor.

The object processor modifies the selected one or more model objects based on the extracted portion of the object field signal, and the extracted feature from the extracted portion of the object field signal, to generate one or more modified model objects. The object processor generates at least one insertion object from the one or more modified model objects based on the extracted portion and the generated histogram. The object processor inserts and/or overlays the one or more modified model objects in the object field signal to generate a modified composite signal, including a modified object field signal, which includes at least one modified program. The object processor may select at least one of an insertion and overlay mode based on a received mode signal.

The format converter converts the modified base composite signal, including the modified object field signal, which includes the at least one modified program, to a modified multimedia signal. The encoder encodes the modified multimedia signal to provide an encoded modified multimedia signal. Further, depending on whether encryption is necessary, the encryptor encrypts the encoded modified multimedia signal.

According to another aspect of the invention, an object insertion method is provided for inserting a selected object into at least one program. The at least one program may be associated with one of a plurality of categories of programs.

According to the method, one or more model objects are received and stored. At least one category of program is selected for which insertion or overlaying is desired to be performed. Further, at least one of the model objects is selected for insertion, or overlaying, in the at least one category of programs. The at least one category of programs includes the at least one program.

Communication is carried out between an object insertion apparatus and a user. The communication includes receiving the selected one or more model objects and the selected at least one category of program. The selected one or more model objects are inserted, or overlayed, in the at least one program based on the selected one or more categories of program.

Further, when a received signal is determined to be encrypted, the received signal is decrypted. The decrypted signal, or the received signal if it is received in decrypted form, is decoded to provide a decoded multimedia signal, which includes the at least one program. The decoded multimedia signal is format converted to generate a base composite signal, which includes the at least one program. The base composite signal includes an object field signal and an audio signal, where the object field signal and the audio signal may be the at least one program.

A portion of the object field signal is extracted from the at least one program. During the portion extraction process, a histogram may be generated for the extracted portion of the object field signal by transforming the extracted portion of the object field signal from a time domain to a frequency domain. A feature is extracted from the extracted portion of the object field signal to provide at least one extracted feature. During the process of feature extraction, at least one motion vector may be generated for the extracted portion of the object field signal. The extracted portion of the object field signal and the at least one extracted feature from the extracted portion of the object field signal are forwarded for object processing.

Object processing is provided for modifying the selected one or more model objects based on the extracted portion of the object field signal, and the extracted feature from the extracted portion of the object field signal, to generate one or more modified model objects. The object processing generates at least one insertion object from the one or more modified model objects based on the extracted portion and the generated histogram. The object processing inserts, or overlays, the one or more modified model objects in the object field signal to generate a modified composite signal, including a modified object field signal, which includes the at least one modified program.

Modified base composite signal, including the modified object field signal, which includes the at least one modified program, are format converted to a modified multimedia signal. The modified multimedia signal may be encoded to provide an encoded modified multimedia signal. Further, depending on whether encryption is necessary, the encoded modified multimedia signal may be encrypted to provide an encrypted encoded modified multimedia signal.

According to yet another aspect of the invention, a computer readable medium for storing a program that inserts a selected object into at least one program, the at least one program being associated with one of a plurality of categories of programs, is provided. The medium includes a storing code segment for storing one or more model objects; a category identifying code segment for identifying a category of program from the plurality of categories of programs; a model object selecting code segment for selecting a model object from the stored one or more model objects based on the identified category of program; an inserting code segment for inserting the selected model object in the at least one program. The medium further includes a receiving code segment for receiving the selected model object and the identified category of program from a user site.

Further, the medium includes a portion extracting code segment for extracting a portion of an object field signal; a feature extracting code segment for extracting a feature from the extracted portion of the object field signal; a modifying code segment for modifying the selected model object based on the extracted portion of the object field signal and the extracted feature from the extracted portion of the object field signal; a histogram generating code segment for generating a histogram for the extracted portion of the object field signal; and a motion vector generating code segment for generating at least one motion vector for the extracted portion of the object field signal.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout the several views of the drawings:

FIGS. 5A through 5F are exemplary images captured by the exemplary multi-image capture scheme of FIG. 4, according to an aspect of the present invention.

DETAILED DESCRIPTION

Figure 1:
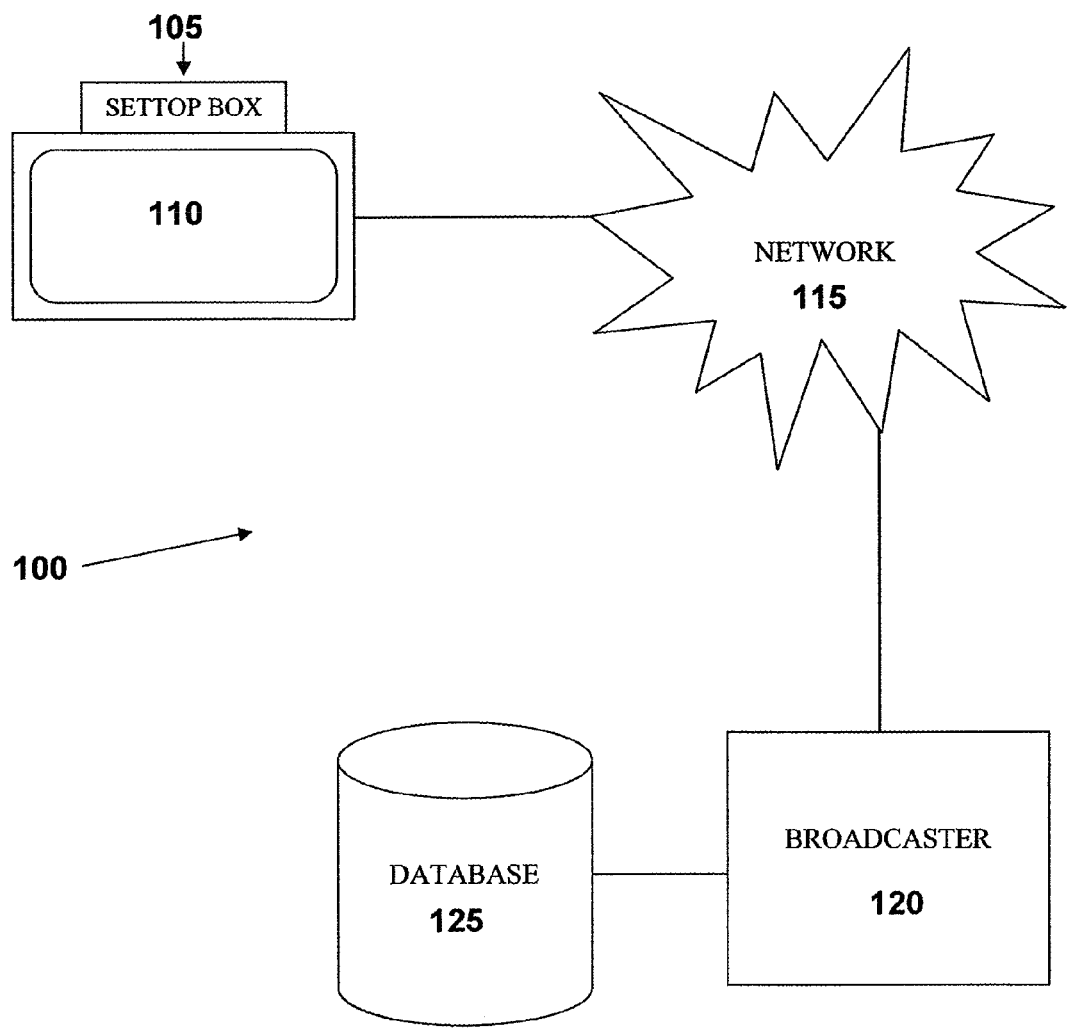
FIG. 1 illustrates an embodiment of a telecommunications system, according to an aspect of the present invention.

An embodiment of the invention is shown in FIG. 1. The system 100 includes a display device 110 for displaying moving or still images. The display device 110 may be, for example, a cathode ray tube (CRT), a liquid crystal display (LCD), a light emitting diode (LED) display, a plasma display panel (PDP), an organic light emitting diode (OLED) display, a surface-conduction electron-emitter display (SED), a carbon nanotube (CNT), a nanocrystal display (NCD), or the like. Moreover, the display device may include user-mounted devices such as, for example, a head-mount display, and/or a three-dimensional display such as, for example, a holographic display.

Further, the display device 110 can be a portable computer device such as, for example, a personal data assistant (PDA), telephone device, portable music player, portable game device, or any other portable computer device capable of displaying still and/or moving images.

The display 110 may include audio speakers (not shown), which are integrally configured in the display 110. However, speakers may be provided separately from the display 110, as is known in the relevant arts.

An image signal is provided to the display 110 via a Settop Box 105. The Settop Box 105 receives multimedia signals from a Broadcaster 120 via wired and/or wireless communications links. In the exemplary embodiment, the multimedia signals are received from a network 115, which may be a local area network, a wide area network, the Internet, or any combination of networks, including wired and/or wireless networks, as the skilled artisan will readily appreciate, without departing from the spirit and/or scope of the invention. The Settop Box 105 converts the received multimedia signal into a standard video image signal and/or a standard audio signal to be reproduced on the display 110. For example, the Settop Box 105 may be configured to decrypt the received multimedia signals and forward the signals as unencrypted, standard video image and/or audio signals capable of reproduction on display 110. The Settop Box 105 may be configured, for example, as device 200 shown in FIG. 2 (described in greater detail below), or it may be an off-the-shelf item available through, for example, local cable companies.

Alternatively, the video image and/or audio signals may be provided directly to the image display 110 from the network 115. In this case, the device 200 may be provided at the Broadcaster 120 or within the image display 110 as an integral device, or as a standalone device located remotely, but accessible to Broadcaster 120.

The multimedia signals are forwarded, or routed, to the Settop Box 105 via network 115 from a Broadcaster 120. A portion of Broadcaster 120 may be configured as device 200 shown in FIG. 2, as stated above. Alternatively, the Broadcaster 120 may include an existing configuration such as, for example, that of an existing cable television broadcaster. The Broadcaster 120 is linked to an external Database 125 for storing, managing and retrieving multimedia data to be broadcast by Broadcaster 120.

Figure 2:
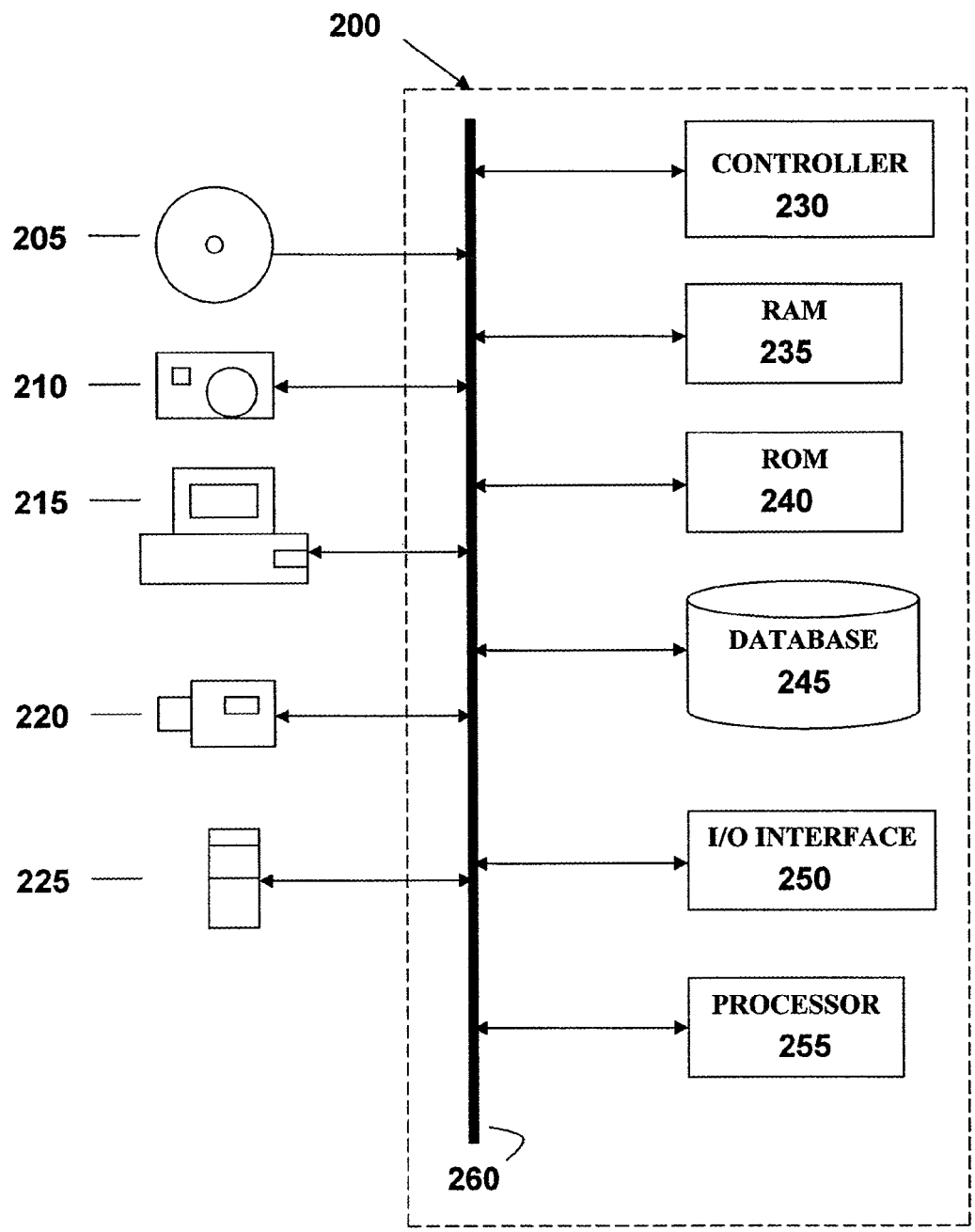
FIG. 2 illustrates an exemplary embodiment of an image insertion apparatus according to an aspect of the present invention.

In an embodiment, Settop Box 105 is configured as device 200 shown in, for example, FIG. 2 in broken lines. However, as stated above, the device 200 may be integrated into the display device 110, the Broadcaster 120, or provided as a separate stand-alone unit at the Broadcaster 120 site or the user site without departing from the scope and/or spirit of the invention.

The device 200 is a Custom Consumer Advertisement Module (CCAM), which may be a standalone device or embodied in another device. CCAM 200 includes a plurality of ports for communicating with other devices, such as multimedia devices 205-225. The CCAM 200 may be coupled to devices 205-225 through wired links, such as, for example, universal serial buses (USB), or through wireless links, such as, for example, optical or electromagnetic frequency communications devices (for example, infrared diode transceivers, radio frequency transceivers, etc.).

The CCAM 200 may be coupled to an external digital video disc (DVD) player 205 through wired or wireless communication linkage to receive multimedia signals from the DVD 205 for display on display 110. Alternatively, the DVD 205 may be internal to the Settop Box 105. The DVD 205 reads multimedia signals from a source DVD, or alternatively, a Blue-ray disc (BD), compact disc (CD), Super Audio compact disc (SACD), or the like, and provides the multimedia signals to a random access memory (RAM) 235. However, the RAM 235 may be bypassed and the multimedia signals from the DVD 205 may be forwarded to a Database 245 for storage.

The CCAM 200 may be configured to be coupleable to a digital camera 210, for retrieving images stored in the camera 210. The CCAM 200 may be configured for real-time image capture using camera 210. The camera 210 may be internal to the Settop Box 105, or it may be provided as a separate, external device that is coupleable to the Settop Box 105.

Further, the CCAM 200 may be coupled to a computer device 215 such as, for example, a personal computer, a desktop computer, a workstation, a laptop computer, a notebook computer, a portable computer, a tablet computer, or the like. Multimedia signals stored in or generated by the computer device 215 may be retrieved and processed by the CCAM 200. The computer device 215 may be integral to the Settop Box 105, or it may be provided externally as shown in, for example, FIG. 2.

Further, the CCAM 200 may be coupled to a video camera 220 for capturing moving images. Moving images may be downloaded from the video camera 220, or may be captured real-time by the video camera 220 under control of the CCAM 200. The video camera may be integral to the Settop Box 105, or it may be provided externally as shown in, for example, FIG. 2.

Further, the CCAM 200 may be coupled to a personal device (PD) 225 such as, for example, a personal data assistant (PDA), a telephone device, or any other computer device capable of providing multimedia signals. The CCAM 200 communicates with PD 225 to exchange multimedia signals. For example, the CCAM 200 may download multimedia signals, such as, for example, still images, moving images, audio segments, computer programs, including computer instructions, and/or global position system (GPS) information from the CCAM 200 to the PD 225. Moreover, the PD 225 may upload multimedia signals, such as, for example, still images, moving images, audio segments, computer programs, including computer instructions, GPS information, and the like, to the CCAM 200.

In an embodiment, the CCAM 200 includes a Controller 230, Random Access Memory (RAM) 235, Read Only Memory (ROM) 240, Database 245, Input/Output (I/O) Interface 250, and Processor 255 for carrying out aspects of the invention.

The Controller 230 controls task management of the components of CCAM 200. In a particular embodiment, the CCAM may include a disc drive unit (not shown), including a computer-readable medium in which one or more sets of instructions, e.g., software and/or segments of code, may be embedded. Further, the instructions may embody one or more of the methods or logic as described herein. In a particular embodiment, the instructions may reside completely, or at least partially, within the Controller 230, the RAM 235, the ROM 240, the Processor 255 and/or the Database 245 during execution by the CCAM 200. The RAM 235, the Database 245 and the Processor 255 also may include computer-readable media. The CCAM 200 operates under control of the Controller 230, to perform customized advertisement insertion.

In alternative embodiments, dedicated hardware implementations for the CCAM 200, such as, for example, application specific integrated circuits, programmable logic arrays and other hardware devices, can be constructed to implement one or more of the methods described herein. Applications that may include various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor, or that cause a computer system to perform any one or more of the methods or operations disclosed herein.

The computer-readable medium may further include a solid-state memory, such as a memory card, that houses one or more non-volatile read-only memories. Further, the computer-readable medium can be a random access memory or other volatile re-writable memory. Additionally, the computer-readable medium can include a magneto-optical or optical medium, such as a disc or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Using, for example, CCAM 200 shown in FIG. 2, a process for customized advertisement insertion may be provided. The system of FIG. 2 can also operate as various elements within the system. For example, a program implementing the disclosure may be loaded and executed on one or more computers.

Figure 3:
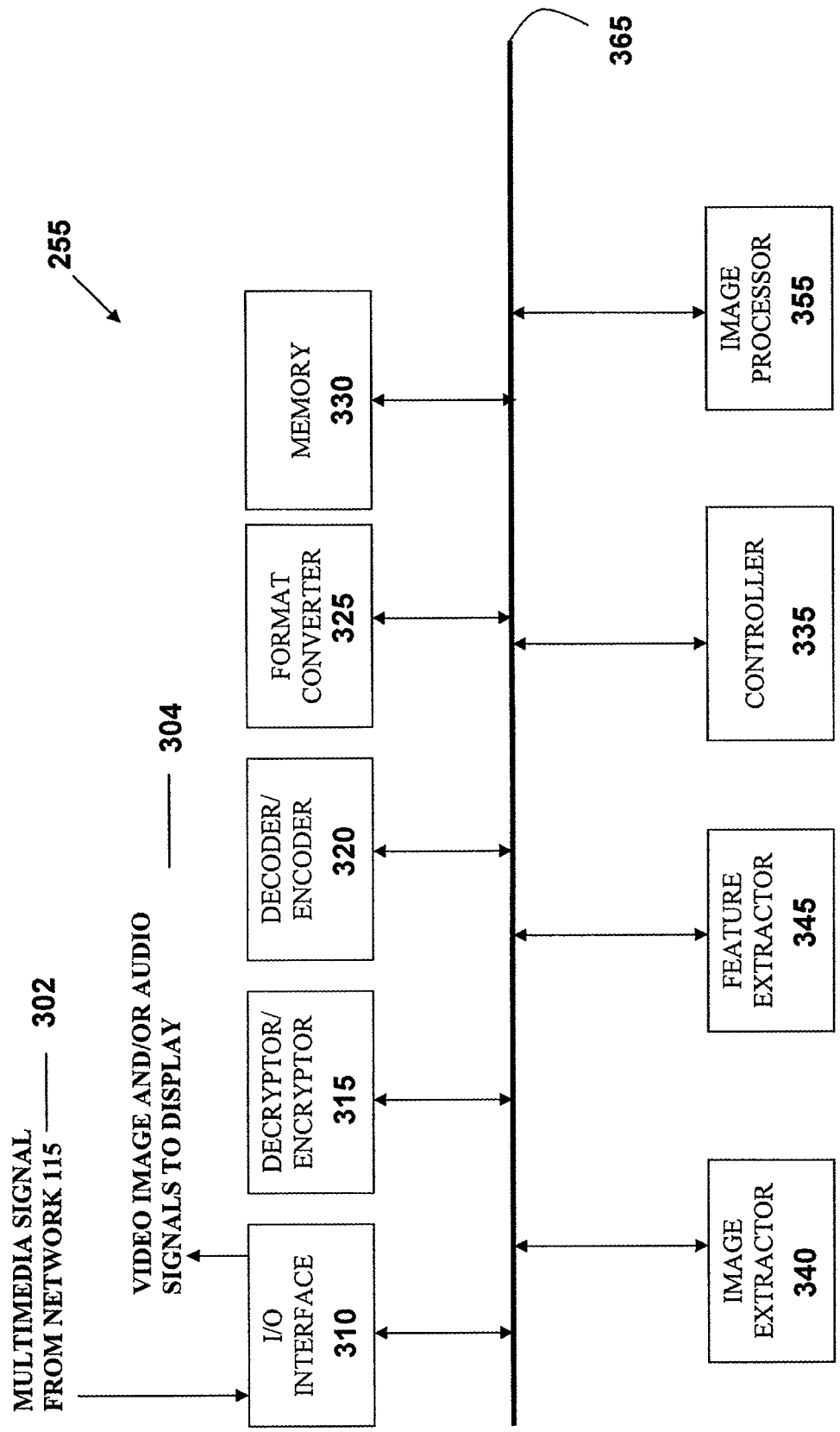
FIG. 3 illustrates an exemplary embodiment of a customized consumer advertisement module according to an aspect of the present invention.

An exemplary, non-limiting embodiment of the Processor 255 (shown in FIG. 2) is provided in FIG. 3. The Processor 255 may include an Input/Output (I/O) Interface module 310 for receiving and sending information; a Decryptor/Encryptor module 315 for decrypting/encrypting signals received from, or to be sent through the I/O Interface module 310; a Decoder/Encoder module 320 for decoding and/or encoding signals received, or to be sent through I/O Interface module 310; a Format Converter module 325 for converting signals to an appropriate format for display and/or signal processing; a Memory module 330 for storing information; a Controller module 335 for controlling task management in the Processor 255; an Image Extractor module 340 for extracting portions of an image signal; a Feature Extractor module 345 for extracting features from the extracted portion of the image signal; and an Image Processor 355 for processing a multimedia signal 302 received by the I/O Interface module 310. The modules communicate via a bus 365.

In an embodiment, the I/O Interface 310 receives the multimedia signal 302 from the network 115. The I/O Interface 310 forwards the received multimedia signal 302 to the Decryptor/Encryptor module 315 and/or the Decoder/Encoder module 320, via the bus 365.

Alternatively, the I/O Interface 310 may be integrated with the I/O Interface 250 (shown in FIG. 2), or eliminated entirely and only the I/O Interface 250 used instead. Moreover, the bus 365 may be eliminated and modules 310 to 355 may be coupled via bus 260 (shown in FIG. 2).

The received multimedia signal 302 is forwarded to the Decryptor/Encryptor module 315. The Decryptor/Encryptor module 315 decrypts the multimedia signal 302, as is well known in the art, and forwards the decrypted signal to Decoder/Encoder module 320. However, if the multimedia signal 302 is not encrypted by, for example, the Broadcaster 120 (FIG. 1), the Decryptor/Encryptor module 315 is not activated and the multimedia signal 302 is forwarded directly to the Decoder/Encoder 320.

The Decoder/Encoder 320 detects the multimedia signal 302, for example, by decoding and decompressing the multimedia signal 302, so as to provide a base composite signal, including an uncompressed video image signal and/or audio signal. The Decoder/Encoder 320 may include video and audio codecs capable of decoding and/or encoding signals having the following exemplary formats: ISO/IEC: MPEG-1, MPEG-1 Layer III (known as MP3), MPEG-1 Layer II, MPEG-2, MPEG-4, MPEG-4/AVC, AAC; HE-AAC; ITU-T: H.261, H.262, H.263, H.264, G711, G.722, G.722.1, G722.2, G.723.1, G.726, G.728, G729, G.729.1, G729a; SMPTE: VC-1; AVS; Dirac; Indeo; MJPEG; RealVideo; Theora; VP7; WMV Audio; AC3; ATRAC; FLAC; iLBC; Monkey's Audio; Musepack; RealAudio; SHN; Speex; Vorbis; WavPack; WMA Image compression formats: ISO/IEC/ITU-T: JPEG, JPEG 2000, JPEG-LS, JBIG, JBIG2; BMP; GIF; ILBM; PCX; PNG; TGA; TIFF; WMP Media container formats 3GP; ASF; AVI; FLV; Matroska; MP4; MXF; NUT; Ogg;

Ogg Media; QuickTime; RealMedia; AIFF; AU; and WAY. The base composite signal is forwarded to the Format Converter 325 and the Memory module 330.

The Format Converter 325 is configured to convert from the image/audio format to a base composite signal, including a video image field signal and/or audio signal, and to convert from a base composite signal to the image/audio formats, e.g., as identified above, as the skilled artisan will readily recognize and comprehend. The resultant base composite signal includes a video image field signal and/or an audio signal, where the audio signal may be the sound signal corresponding to the image field signal. As a result, information may be obtained from devices 205 to 225 (shown in FIG. 2), which may provide for different formats (such as, for example, those mentioned above), other than, for example, an MPEG video format used by display 110 (shown in FIG. 1). Moreover, information may be forwarded to devices 205 to 225 after conversion of the base composite signals by the Format Converter 325 to a format useable by devices 205 to 225, as is known in the art.

The Memory 330 stores decoded signals decoded by Decoder/Encoder module 320, as well as base composite signals output by Format Converter module 325. The Memory 330 may serve as a temporary storage for working data used by the Processor 255.

The Image Extractor module 340 analyzes the composite signals stored in the Memory 330. In accordance with instructions received from the Controller 335, the Image Extractor 340 determines which portions of an image field component, for example, of a base composite signal to extract. The extraction determination is made based on, for example, image recognition techniques and/or edge detection of the image field signal, as is well known by those skilled in the image processing technologies.

In one non-limiting example according to an aspect of the invention, the Image Extractor 340 may extract the face of an Actor in a television commercial for an automobile. The Image Extractor 340 transforms the extracted portion of the image field—in this example, the Actor's face—from the time domain to the frequency domain using, for example, a cosine transform, a Fourier transform, or any other well known image processing transform, to provide a histogram of the extracted portion (e.g., the Actor's face).

The Feature Extractor 345 receives the extracted portion of the image field and the corresponding histogram for each image field signal. The Feature Extractor 345 derives a plurality of motion vectors for the extracted portion of the image field through, for example, phase correlation between two or more image fields, or any other image motion vector generation scheme as is known in the art. The derived motion vectors provide, for example, movement information regarding the different parts of the extracted portion of the image field. For example, in the above mentioned automobile advertisement, the Feature Extractor 345 would identify the movement vectors pertaining to, for example, the movement of the Actor's lips, eyes, facial muscles, eyebrows, etc. The Feature Extractor 345 outputs the generated motion vectors for each field.

Under control of the Controller 335, the output motion vectors from the Feature Extractor 345 are correlated to the corresponding extracted portions and histograms output from the Image Extractor 340 for each image field. The motion vectors and the corresponding extracted portions and histograms are stored in the Memory 330. However, the skilled artisan will readily appreciate that the image portion extraction and histogram generation of the Image Extractor 340 may be correlated to the motion vector generation of the Feature Extractor 345 without instructions from the Controller 335.

The Image Processor 355 receives the original image field signal, the corresponding extracted portions, the corresponding histogram, and the corresponding motion vectors for the original image field signal from the Memory 330. However, the Image Processor 355 may receive the corresponding extracted portions, the corresponding histogram, and the motion vectors directly from the Image Extractor 340 and the Feature Extractor 345. The Image Processor 355 further retrieves a three-dimensional model image from the Memory 330 and/or the Database 245 (shown in FIG. 2). The Image Processor 355 extracts a portion of the three-dimensional model image to provide a model insertion image signal, which will be inserted into the composite signal in lieu of or as an overlay of the extracted portion.

In alternative embodiments, the Image Processor 355 determines the model insertion image signal in at least one of two ways. However, the skilled artisan will readily recognize that other methodologies may be equally employed without departing from the scope and/or spirit of the invention.

For example, an image azimuth angle signal $\Theta$ and an image altitude angle signal $\phi$ may be included in each image field signal for each portion to be extracted from the image field. The image azimuth and altitude angle signals (jointly referred to as the composite angle signal, which include coordinates $\Theta$ and $\phi$) would allow, for example, the Image Processor 355 to determine that the extracted portion (such as, the Actor's face in the automobile advertisement mentioned above) is a direct ($\phi=0$ degrees), front angle ($\Theta=0$ degrees) camera shot of the Actor's face. The composite angle signal ($\Theta$, $\phi$) may be provided by the Broadcaster 120 (shown in FIG. 1), for example, in the blanking interval or vestigial sidebands in the case of an analog signal, or in the extended data packets in the case of a digital signal.

Alternatively, the Image Processor 355 may be configured to analyze an extracted portion for each image field and identify the azimuth and altitude angles of the extracted portion. For example, the Processor 355 may analyze the extracted portions and corresponding histograms output from Image Extractor 340, and the extracted motion vectors output by the Feature Extractor 345 over a plurality of image fields to determine, for example, a distance between an Actor's eyes relative to the Actor's nose, as well as a distance between the Actor's eyes and the Actor's hair-line and/or a plurality of points along a perimeter of the Actor's head.

Once the model insertion image has been identified, the scale of the identified model insertion image may be adjusted by the Image Processor 355, so as to coincide with the scale of the extracted portion. Moreover, the model insertion image may be adjusted in terms of display characteristics such as hue, saturation color space, contrast, brightness, color temperature, and the like, to match similar attributes of the extracted portion. Further, the surrounding portions of the original image field, adjacent to the extracted portion, are also analyzed in terms of the above display characteristics and the resultant data may be used to further modify the identified model insertion image so as to provide proper blending of the identified model insertion image into the original image field.

The Image Processor 355 further determines feature adjustment in the extracted portion based on, for example, the motion vectors provided by Feature Extractor 345. Particularly, Image Processor 355 adjusts parts of the identified model image to match similar parts in the extracted portion. For example, in the above automobile advertisement example, where the face of an Actor has been extracted by Image Extractor 340, the Image Processor will determine, for example, movement of the Actor's eyes and lips based on the motion vectors provided by Feature Extractor 345 and apply similar motion vectors to the identified model image (i.e., the image to be inserted). Thus, in the automobile advertisement example, an image of the user's face, for example, will be inserted into the original image fields such that the user's face will replace the Actor's face, including the specific gestures, body language, and other attributes.

Figure 4:
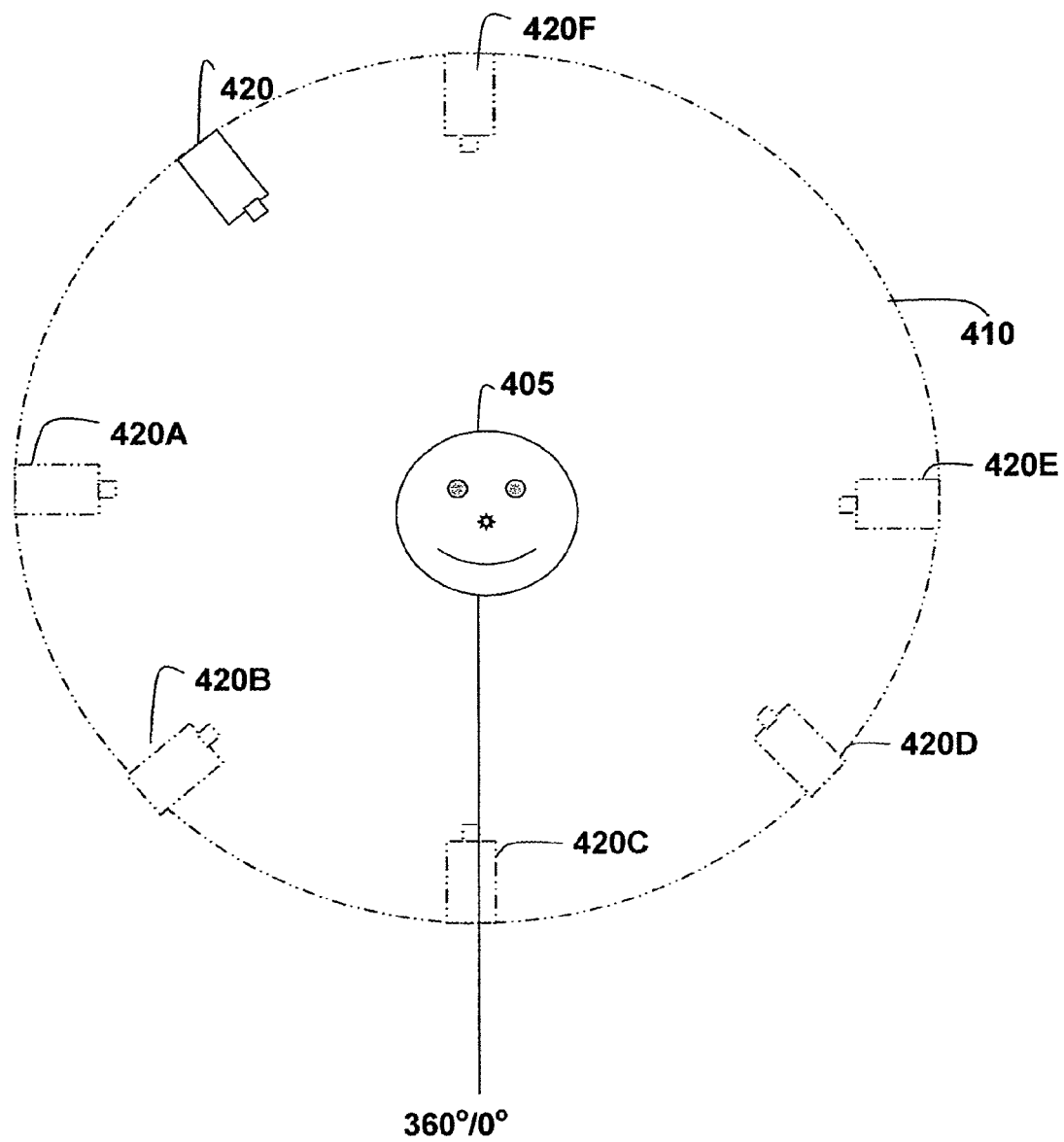
FIG. 4 illustrates an exemplary multi-image capture scheme for generating a model image according to an aspect of the present invention.

Referring to FIG. 4, an exemplary embodiment is provided for capturing one or more images for insertion by the CCAM 200, according to an aspect of the invention. For simplicity of explanation, the embodiment is shown to include planar-movement of an image capture device 420 in the two-dimensional X-Z plane, where the azimuth angle ($\Theta$) varies, but the altitude angle ($\phi$) is fixed at 0 degrees. However, the skilled artisan will readily recognize and appreciate that the image capture device 420 may also be moved in the third-dimension, where the altitude angle $\theta$ varies in a range between minus 90 degrees and plus 90 degrees so as to generate a complete three-dimensional image model of the subject 405.

Figure 6:
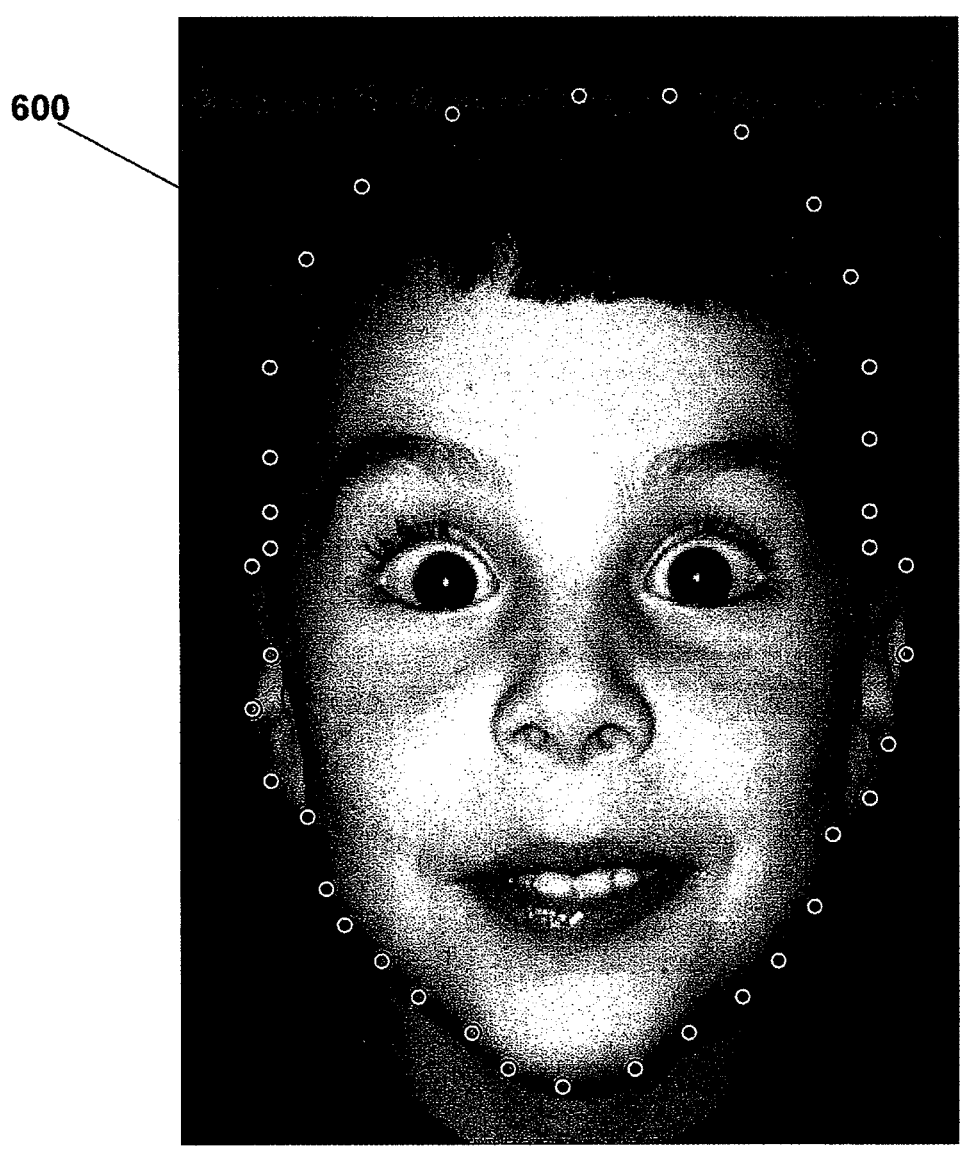
FIG. 6 is exemplary image showing a portion of a model image to be extracted according to an aspect of the present invention.

According to the depicted embodiment, the subject 405 is positioned at the center of a circular orbit 410 (or spherical orbit 410 in the case of three-dimensional image capture). The three-dimensional coordinates of the subject 405 relative to the position of image capture device 420 are determined and recorded through known coordinate-registration systems such as, for example, multi-point-touch registration, or by any other method capable of accurately registering a three dimensional position of one or more points on the surface of subject 405 relative to the image capture device 420. For example, as shown in FIG. 6, the image capture device 420 may be registered relative to the subject 405 by touching the subject 405 with an image registration device (not shown), included in the image capture device 420, or provided separately, at one or more of points 600 and recording the relative coordinates (x, y, z) of the one or more touched points 600.

The image capture device 420 is initialized at an arbitrary position such as, for example, 420A in FIG. 4. The three-dimensional coordinates corresponding to point 420A of the image capture device 420 are recorded for the initial position 420A, as well as the relationship between the image capture device 420 position and the position of subject 405. Moreover, the perspective angle of image capture is recorded for point 420A—in the non-limiting example shown in FIG. 4, the angle is 270 degrees, representing the right profile perspective image of the subject 405. The image capture device 420 may be moved through n discrete positions, where n is a whole number integer greater than or equal to one so as to capture various perspectives of the subject 405. The plurality of captured images, including positional information and respective perspective angles of image capture relative to the subject 405 are recorded such that a three-dimensional image may be reproduced.

For example, referring to FIGS. 5A through 5F, six exemplary, non-limiting images (n=6) are shown that may be captured for the six respective positional points 420A to 420F (in FIG. 4) of the image capture device 420. For example, the image of the subject 405 captured from an initial position 420A of the image capture device 420 is depicted in FIG. 5A, which corresponds to a 270 degree offset from the reference axis (0 degrees) of a direct view of the subject's face image (shown, for example, in FIG. 5C). A second image of the subject 405 captured from the position 420B of the image capture device 420 is depicted in FIG. 5B, which corresponds to a 315 degree offset from the reference axis. A third image of the subject 405 captured from the position 420C of the image capture device 420 is depicted in FIG. 5C, which corresponds to the reference axis (0 degrees). A fourth image of the subject 405 captured from the position 420D of the image capture device 420 is depicted in FIG. 5D, which corresponds to a 45 degree offset from the reference axis. A fifth image of the subject image 405 captured from the position 420E of the image capture device 420 is depicted in FIG. 5E, which corresponds to a 90 degree offset from the reference axis. And, a sixth image of the subject 405 captured from the position 420F of the image capture device 420 is depicted in FIG. 5F, which corresponds to a 180 degrees offset from the reference axis.

The multiple captured images (e.g., FIGS. 5A to 5F) of the subject 405, including at least one image of the face of subject 405 (FIG. 5C), are processed and combined to create a three-dimensional image of the subject 405, as the skilled artisans will readily appreciate. The three-dimensional image of the subject 405, including each of the discrete images captured from the positions 420A to 420F in FIG. 4, are temporarily stored, referring to FIG. 2, in the CCAM 200 working memory, RAM 235, and subsequently recorded in Database 245 for subsequent retrieval.

A process that may be executed by CCAM 200, according to an aspect of the invention, will be described below, with reference to FIG. 7. Moreover, a computer readable medium is provided having recorded thereon code segments for each of the below described processes.

Figure 7:
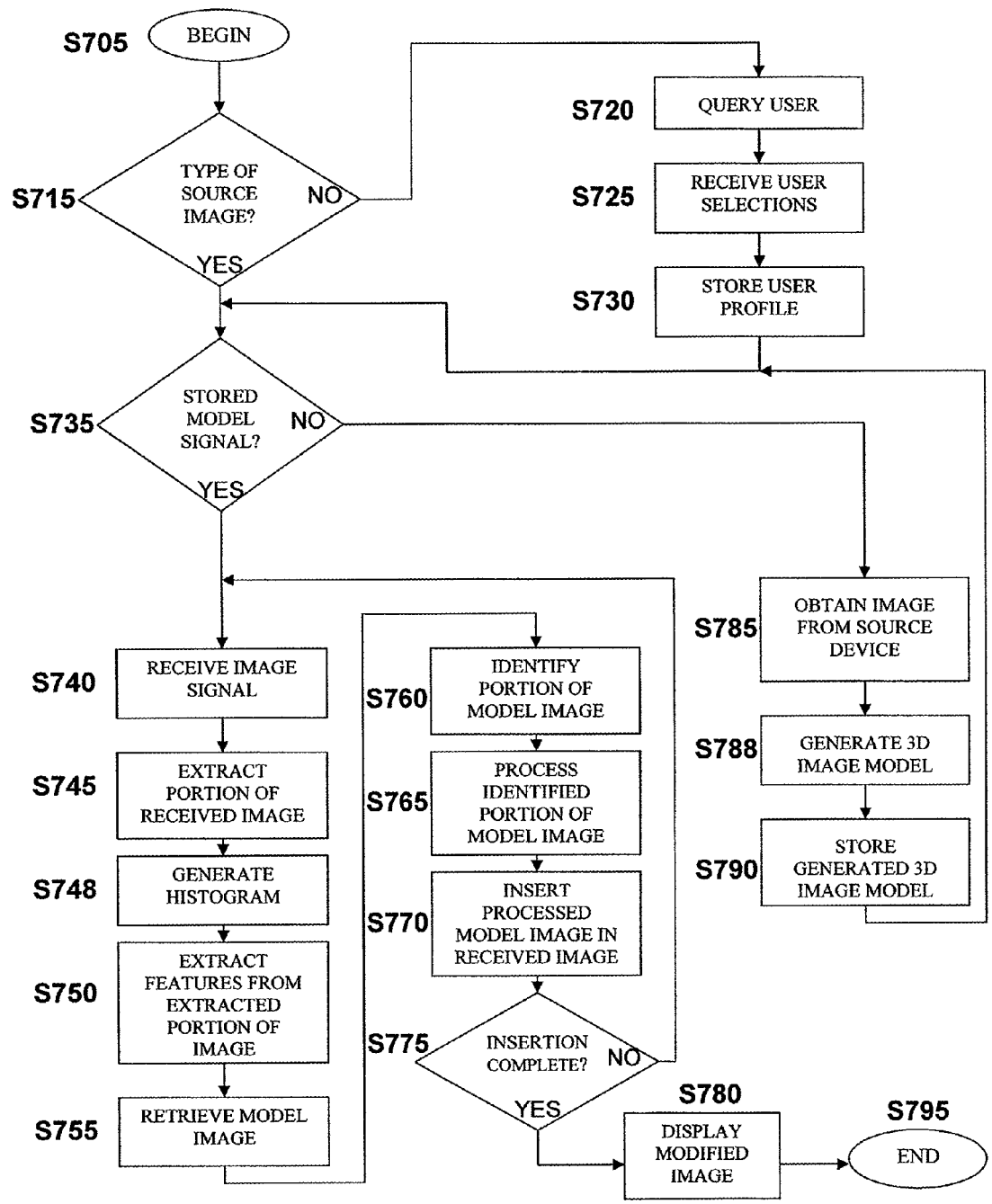
FIG. 7 is a flow diagram of an exemplary process for inserting a selected image in a selected category of advertisement according to an aspect of the present invention.

Referring to FIG. 7, the exemplary process begins (step S705) at initialization of the CCAM 200 and determines that image insertion has been selected by the user. The process determines whether one or more specific categories of source signals have been selected by the user (step S715). The categories may include, for example, various categories of television commercials. Hence, the user may select specific categories, including, but not limited to, advertisements for automobiles, hair products, men's clothing, men's accessories, women's clothing, women's accessories, baby products, pet products, etc. The various categories may be determined in a variety of ways, without departing from the spirit and/or scope of the invention. For example, the Broadcaster 120 may determine the categories of source signals, grouping advertisements according to the advertisers' instructions or its own cataloging systems. Alternatively, the users may create their own categories based on individual preferences.

If the process determines that a specific category of source signals has not been selected by the user ("NO" at step S715), the process queries the user for one or more specific categories (step S720). The query may be, for example, an interactive session provided via the display 110 (shown in FIG. 1) over a communication link such as, for example, the Network 115 (shown in FIG. 1) where the user is provided with a list of categories of source signals the user may select for image insertion.

The Settop box 105 may include an input device such as, for example, a keyboard (not shown), an interactive voice control module, or the like, by which the user may input information, including user selections. Further, the user may be provided with a telephone number or URL address which the user may contact and input selections via existing telephone hardware or computer hardware as is known in the related arts.

Alternatively, rather than an interactive session as described above, or in addition to the interactive session, the process may cause a survey or list to be mailed via a physical medium (such as, for example, United States Postal Service mail) or electronic medium (such as, for example, email, text messaging, instant messaging, etc.) to the user. The survey or list may include various types or categories of television advertisements that are commonly broadcast by, for example, Broadcaster 120 (shown in FIG. 1). The user would be invited to select those categories of advertisements within which the user desires to insert a user selected/defined image.

In addition to the survey or list, a questionnaire may be provided requesting user feedback and/or comments. The questionnaire may include questions directed to determining what type of further advertising the user would like to receive.

In an alternative embodiment, according to an aspect of the invention, the CCAM 200 may be integrated in the Broadcaster 120 rather than the Settop Box 105 (shown in FIG. 1). In this instance, a questionnaire may be provided to a user offering customized commercial advertisement. In addition to the offer, the questionnaire may request the user to select one or more categories of advertisements in which the user would like to insert a user selected image. The user would further be requested to provide a series of images (for example, shown in FIGS. 5A to 5F), discussed below with respect to step S785.

Returning to FIG. 7, upon completion of the interactive session with the user (step S720), for example, the process receives the user's selections of specific categories (step S725). The received user's selections (and images if applicable) are then stored in a user profile file (step S730), e.g., in the Database 245 (FIG. 2) and/or the Database 125 (FIG. 1), as discussed above. In addition to specific categories of advertisements desired to be modified to insert user defined images, the user profile file may include further information such as, user billing information; services provided to user; specific images that may be inserted; one or more look up tables listing stored images and types of advertisements in which the stored images may be inserted; user address, including mail and email addresses; user telephone number; user name and/or identification information; and/or one or more user defined avatars that may be inserted into the selected categories of advertisements.

The process then proceeds to determine whether one or more images for insertion have been stored (step S735). Likewise, If the process determines that a specific category of source image signal has been identified by the user ("YES" at step S715), the process determines whether one or more images have been stored (step S735).

If it is determined that one or more images are not stored ("NO" at step S735), the process queries the user through a user interface, such as, for example, the display 110 in FIG. 1, and obtains one or more images from a source device (step S785). The Settop box 105 may store the received one or more images in a portion of the Database 245, for example. The Settop box 105, via CCAM 200, inserts the user's selected images into the user defined categories of advertisements at the user site. The selected images may be inserted on a real-time basis as broadcast signals are received, or on an a priori basis where the selected images are inserted into advertisements and stored in Database 245, for example.

Alternatively, as discussed above, the query may occur through an interactive session with the user via the Network 115, on the user's display 110 (FIG. 1), or the query may be sent (via physical or electronic mail) to the user in the form of a survey, list and/or questionnaire, as discussed above with respect to step S725. The Broadcaster 120 may store the received series of images in a portion of the Database 125, for example, dedicated to the user. The Broadcaster 120 may insert the user's selected images into the user defined categories of advertisements at the transmitter end so that the user would receive, at the Settop Box 105, a multimedia signal that includes a modified image signal, including an inserted image. The selected images may be inserted on a real-time basis as broadcast signals are prepared for broadcast, or on an a priori basis where the selected images are inserted into advertisements, for example, and stored in Database 125.

The obtained one or more images are then processed to generate a three-dimensional model image (step S788), as discussed, for example, with respect to FIGS. 4-6. The three-dimensional model image, including the one or more images, is stored (step S790). Once the model image, including the one or more images, is stored (step S790), e.g., in the Database 245 (FIG. 2) and/or the Database 125 (FIG. 1), the process returns to the preceding inquiry, where a determination is made whether an image model has been stored (step S735).

If it is determined that one or more images are stored ("YES" at step S735), for example, at the Settop Box 105 or the Broadcaster 120, then the process receives a multimedia signal that includes a source image signal of the category identified by the user, decoded and converted into a base composite signal that includes an image field signal (step S740). In an embodiment, the multimedia signal may also need to be decrypted to obtain the base component signal. The image field signal is then analyzed, and one or more portions of the image field signal are extracted based on the analysis (step S745). The extracted one or more portions are transformed from the time domain to the frequency domain, and a histogram is generated for each of the extracted portions (step S748). The extracted one or more portions are further analyzed and features are extracted from the one or more extracted portions, generating motion vectors for the one or more extracted portions (step S750).

The process retrieves a user defined and selected model image (step S755), for example, stored at step S790. One or more portions of the retrieved model image are identified (step S760). The identified one or more portions of the model image are processed to adjust the attributes of the identified one or more portions of the model image, the attributes including, for example, edge-blending effect, scale, hue, brightness, color saturation, etc. (step S765). The processed one or more model image portions are inserted into the received image field signal in place of the one or more extracted portions, or as overlay onto the received image field signal (step S770). The process may insert or overlay the processed one or more model image portions into the received image field signal based on a received mode signal, which indicates selection of an insert mode, overlay mode, or a composite of insert and overlay modes.

The process determines if image insertion is completed (step S775). If image insertion is complete ("YES" at step S775), the modified image is displayed (step S780), for example, on the display 110, and the process ends (step S795). However, if the process determines that image insertion is not complete ("NO" at step S775), the process returns to receive further image field signals (step S740).

In this manner, a user is able to select a category of advertisements or other source media, which the user would like to modify with personalized images, sound, or other type of indicia. The selected category of advertisements may be modified at the user site or at the broadcaster site, thereby providing reproduction of personalized multimedia signals.

Although the above disclosure has been provided with examples of modifying multimedia signals to insert and/or overlay user-defined images, the skilled artisan will readily appreciate that multimedia signals may also be modified to insert and/or overlay sound signals, control signals, and like, without departing from the scope and/or spirit of the invention. For example, in addition or alternatively to processing video signals as discussed above, vowels, words, phrases, and/or other sounds may be implemented in modifying the multimedia signals to provide personalized audio portions of multimedia signals. In this regard, for example, a user may store vowels, words, phrases, and/or other sounds and the Processor 255 (in FIG. 2) may generate one or more signature files based on the stored sounds to generate sound signals to be inserted or overlayed in the received multimedia signal, which may be in the form of a radio broadcast signal.

Further, the apparatus, method and/or computer readable medium discussed above may include modifying received radio programs and/or advertisements by inserting and/or overlaying user-defined sound signals. In this regard, the received radio programs may be broadcast by satellite radio broadcast entities.

Further, the apparatus, method and/or computer readable medium discussed above may include modifying received video and/or sound signals received from a computer game device, which may be a standalone computer or a remote computer connected via a network (such as, for example, a local area network, a wide area network, or the like), to insert and/or overlay user-defined image and/or sound signals. In this regard, user defined objects, which may include video and/or audio, may be inserted and/or overlayed into a received multimedia signal from the computer game device such that a displayed video game will include user defined objects. For example, a computer game user may insert or overlay an image of his own face and/or the user's own voice instead of the face and/or voice of a character in a computer game.

Further, the term "insert," or any derivative thereof, as used in herein, is meant to also include "overlay," or any derivative thereof, and/or "blend," or any derivative thereof.

Further, the apparatus, method and/or computer readable medium discussed above may include user-specific and/or account-specific customized modification information. For example, a plurality of profiles may be provided that include parameters specific to one or more users and/or user accounts. Each profile may contain one or more of the following parameters for personalized modification of advertisements, or other source media. The parameters may include, for example, a password to access the user profile and/or activate personalized image insertion; at least one selected category of advertisement, or other source media; billing information specific to the user and/or user account; services provided to the specific user and/or user account; specific images that may be inserted for the specific user and/or user account; one or more look up tables listing stored images and types of advertisements in which the stored images may be inserted for the specific user and/or user account; user address, including mail and email addresses for the specific user and/or user account; at least one telephone number for the specific user and/or user account; a user name and/or identification information, including biometric information such as, for example, fingerprint, retinal print, and the like; and/or one or more user defined avatars that may be inserted into the selected categories of advertisements for the specific user and/or user account.

Further, the invention may be used in systems including, for example, a server-client relationship and/or peer-to-peer relationship. The invention may be used by service providers such as, for example, Internet service providers so as to enable users to personalize advertisements that may be reproduced at the terminals of the users, including such advertisements as, for example, pop-advertisements, and the like.

Further, the invention may be used by program broadcasters, including television and radio broadcasters and/or other service providers, to modify transmitted programs such as, for example, television shows, including game shows, "sit-coms," "made-for-television movies," with personalized images and/or sounds. For example, user-defined multimedia signals, including images and/or sounds, may be sent to a television or radio broadcaster, which then uses the user-defined multimedia signals to modify a transmitted game show so as to insert or overlay the user-defined multimedia signal, including images, sounds and/or other indicia, to alter or customize the appearance or voice of the contestants and/or host. An embodiment of the present disclosure which is used in association with a radio broadcast, for example, is described in detail hereinafter.

The selected category of advertisements may be modified at a user site. Personalized information provided by a user may be stored, retrieved, processed and inserted or overlaid at the user site into received multimedia signals to provide reproduction of personalized multimedia signals.

Further, the selected category of advertisements may be modified at a broadcaster site. In that case, personalized information may be provided from a user to a broadcaster via a communication link, including physical or electronic communication media. The personalized information may be stored, retrieved, processed and inserted or overlaid at the broadcaster site into multimedia signals that are transmitted, or may be transmitted at some later time to one or more user sites.

Figure 8:
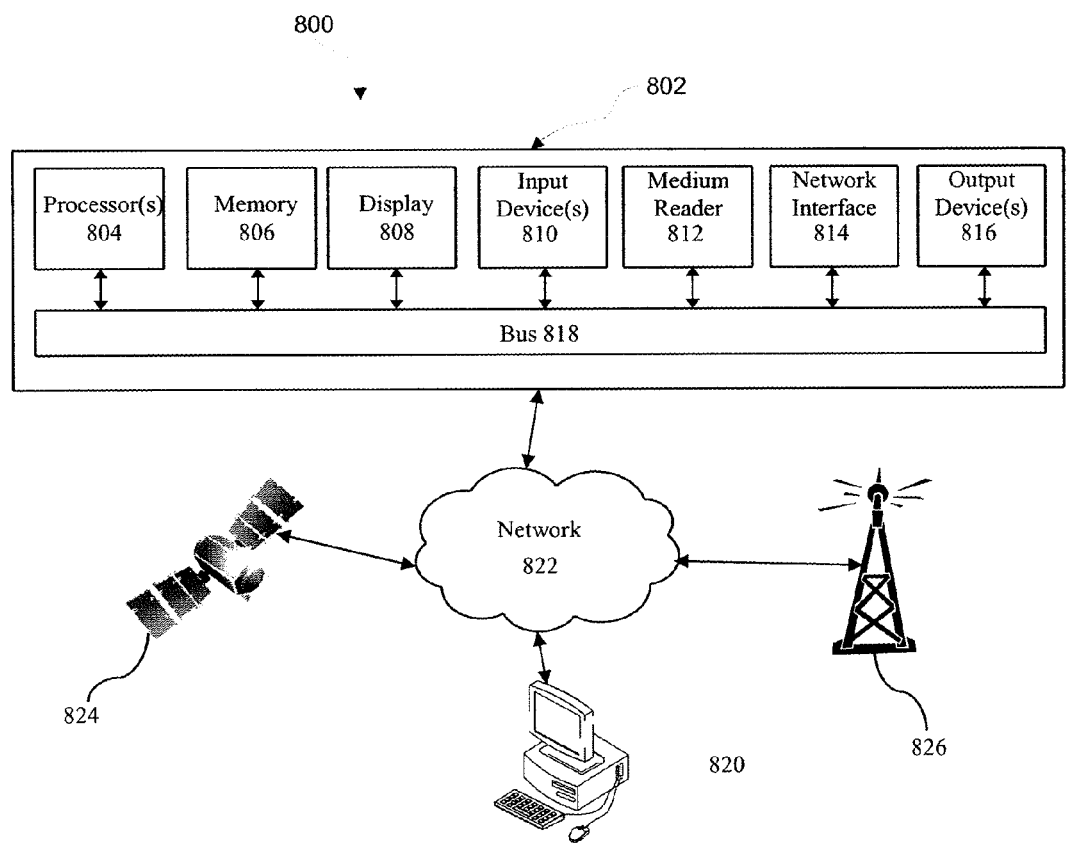
FIG. 8 illustrates an exemplary embodiment of an advertisement system, according to an aspect of the present invention.

FIG. 8 generally shows an exemplary advertising system 800 for use in accordance with the embodiments described herein. The advertising system 800 is generally shown and may include a computer display system 802, which is generally indicated. The computer display system 802 may be the same or similar to the device 200 of FIG. 2, as described herein. The computer display system 802 may operate as a standalone device or may be connected to other systems or peripheral devices. For example, the computer display system 802 may include, or be included within, any one or more computers, servers, systems, communication networks or cloud environment.

The computer display system 802 may operate in the capacity of a server in a network environment, or the in the capacity of a client user computer in the network environment. The computer display system 802, or portions thereof, may be implemented as, or incorporated into, various devices, such as a moving vehicle. The moving vehicle may be, for example, an automobile, a motorcycle, an airplane, a train, or any other moving vehicle commonly known and understood in the art. In even further embodiments of the present application, the computer display system 802, or portions thereof, may be implemented as, or incorporated into, further devices such as a personal computer, a tablet computer, a set-top box, a personal digital assistant, a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that device. Further, while a single computer display system 802 is illustrated, additional embodiments may include any collection of systems or subsystems that individually or jointly execute instructions or perform functions.

As illustrated in FIG. 8, the computer display system 802 may include at least one processor 804, such as, for example, a central processing unit, a graphics processing unit, or both. The processor 802 may be the same or similar to either or both of the controller 230 and the processor 255 of FIG. 2, as described herein.

The computer display system 802 may also include a computer memory 806. The computer memory 806 may be the same or similar to either or any of the RAM 235, ROM 240, and database 245 of FIG. 2, as described herein. In this regard, the computer memory 806 may include a static memory, a dynamic memory, or both. The computer memory 806 may additionally or alternatively include a hard disk, random access memory, a cache, or any combination thereof. Of course, those skilled in the art appreciate that the computer memory 806 may comprise any combination of known memories or a single storage.

As shown in FIG. 8, the computer display system 802 may include a computer display 808, such as a liquid crystal display, an organic light emitting diode, a flat panel display, a solid state display, a cathode ray tube, a plasma display, or any other known display. In embodiments of the computer display system 802, the computer display 808 may comprise a touchscreen display, as generally known and understood in the art.

The computer display system 802 may include at least one computer input device 810, such as a keyboard, a remote control device having a wireless keypad, a microphone coupled to a speech recognition engine, a camera such as a video camera or still camera, a cursor control device, or any combination thereof. Those skilled in the art appreciate that various embodiments of the computer display system 802 may include multiple input devices 810. Moreover, those skilled in the art further appreciate that the above-listed, exemplary input devices 810 are not meant to be exhaustive and that the computer display system 802 may include any additional, or alternative, input devices 810.

The computer display system 802 may also include a medium reader 812 and a network interface 814. Furthermore, the computer display system 802 may include any additional devices, components, parts, peripherals, hardware, software or any combination thereof which are commonly known and understood as being included with or within a computer system, such as, but not limited to, an output device 816. The output device 816 may be integral with the computer display system 802, or may be connected to the computer display system 802 via an interface such as the I/O interface 250 of FIG. 2, as described herein. The output device 816 may be, but is not limited to, a speaker, an audio out, a video out, a remote control output, a printer, or any combination thereof. Exemplary output devices are shown in FIG. 2 at 210, 215, 220, and 225. Nevertheless, it should be known and understood that the output devices 210, 215, 220, and 215 of FIG. 2 are merely exemplary and are not limiting or exhaustive.

Each of the components of the computer display system 802 may be interconnected and communicate via a bus 818. The bus 818 may be the same or similar to the bus 260 of FIG. 2, as described herein. As shown in FIG. 8, the components may each be interconnected and communicate via an internal bus. However, those skilled in the art appreciate that any of the components may also be connected via an expansion bus. Moreover, the bus 818 may enable communication via any standard or other specification commonly known and understood such as, but not limited to, peripheral component interconnect, peripheral component interconnect express, parallel advanced technology attachment, serial advanced technology attachment, etc.

The computer display system 802 may be in communication with one or more additional computer devices 820 via a network 822. The network 822 may be, but is not limited to, a local area network, a wide area network, the Internet, a telephony network, or any other network commonly known and understood in the art. The network 822 is shown in FIG. 8 as a wireless network. However, those skilled in the art appreciate that the network 822 may also be a wired network.

The computer display system 802 may also be in communication with one or more additional devices via the network 822, such as, but not limited to, a satellite 824 and an antenna 826. The satellite 824 may be a satellite radio, and the antenna 826 may be a radio antenna. In this regard, the satellite 824 and the antenna 826 may broadcast radio signals which are received by the computer display system 802 in accordance with known teachings.

The additional computer display device 820 is shown in FIG. 8 as a personal computer. However, those skilled in the art appreciate that, in alternative embodiments of the present application, the device 820 may be a laptop computer, a tablet PC, a personal digital assistant, a mobile device, a palmtop computer, a desktop computer, a communications device, a wireless telephone, a personal trusted device, a web appliance, or any other device that is capable of executing a set of instructions, sequential or otherwise, that specify actions to be taken by that device. Of course, those skilled in the art appreciate that the above-listed devices are merely exemplary devices and that the device 820 may be any additional device or apparatus commonly known and understood in the art without departing from the scope of the present application. Furthermore, those skilled in the art similarly understand that the device may be any combination of devices and apparatuses.

Of course, those skilled in the art appreciate that the above-listed components of the computer display system 802 are merely meant to be exemplary and are not intended to be exhaustive and/or inclusive. Furthermore, the examples of the components listed above are also meant to be exemplary and similarly are not meant to be exhaustive and/or inclusive.

Figure 9:
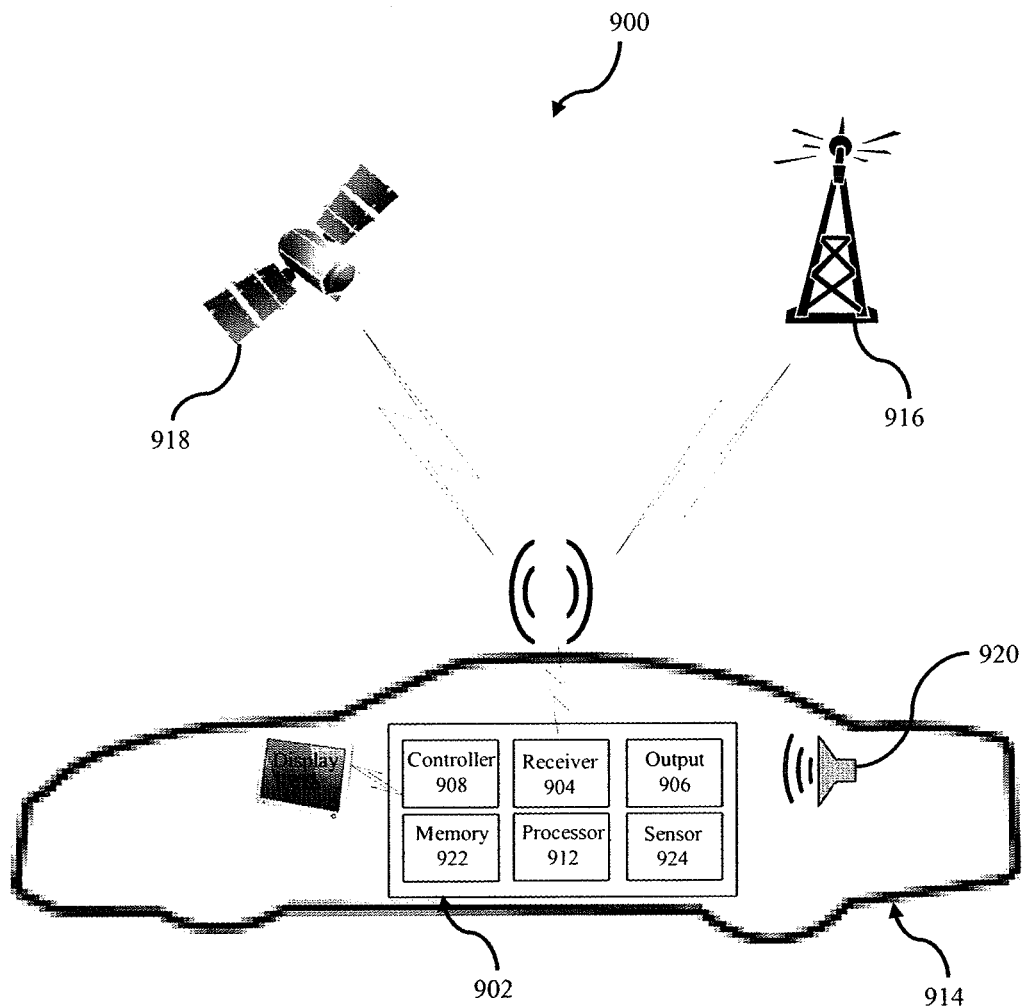
FIG. 9 illustrates an exemplary embodiment of an advertising system, according to an additional aspect of the present invention.

An exemplary schematic of an advertising system is generally shown in FIG. 9 at 900. The advertising system 900 includes a display system 902. The display system 902 is generally indicated and is shown as including, inter alia, a receiver 904, an output 906, a controller 908, a display 910, and a processor 912. Nevertheless, it is to be understood that the display system 900 may include any additional or alternative combination of features as described with respect to FIG. 8 and FIG. 2. The display system 900 may even further include additional or alternative features which are not shown by FIG. 8 and FIG. 2 which are known in the art without departing from the scope of the application.

The display system 902 of FIG. 9 is shown as being included within a vehicle 914. Nevertheless, the display system 902 need not be included within a vehicle and may operate within additional articles or as a stand-alone system. The vehicle 914 is shown in FIG. 9 as being an automobile. However, in further embodiments, the display system 902 may be included within alternative vehicles, such as, but not limited to, a truck, a tractor, an airplane, a train, a boat, or bus. Of course, the above-list of vehicles is not limiting or exhaustive. The display system 902 may be included within any additional or alternative vehicles without departing from the scope of the present application.

The display system 902 may be integral with the vehicle 914 or separate from the vehicle 914. In an embodiment of the present application, the display system 902 may be included within or comprise a navigation system of the vehicle 914. The navigation system may comprise an original equipment manufacturer system or an after-market system.

As shown in FIG. 9, the display system 902 includes a receiver 904. The receiver 904 may be the same or similar to the network interface 814 as described with respect to FIG. 8, or the same or similar to the I/O interface 250 of FIG. 2. In even further embodiments, the receiver 904 may be a radio receiver, a satellite receiver, or any other receiver which is known and understood in the art. The receiver 904 is configured to receive a media signal. The media signal may originate from an antenna 916 or a satellite 918, as shown in FIG. 9. The antenna 916 and the satellite 918 may be configured to broadcast the media signal as described herein with respect to the broadcaster 120 as shown in FIG. 1. The media signal may be a radio signal or any other type of media signal which is known and understood in the art. The radio signal may be, for example, a digital signal, an analog signal, a frequency modulation (FM) broadcast signal, an amplitude modulation (AM) broadcast signal, or any other known and understood signal.

The output 906 of the display system 902 is configured to output the media signal to an output device, such as the output device 816 of FIG. 8. For example, the output 906 of the display system 902 may be configured to output the media signal to the display 910 or a speaker, or speakers, of the vehicle 914. According to an embodiment of the present application in which the media signal includes a radio broadcast that is received by the receiver 904, the output 906 may be configured to output the radio broadcast as an audio signal to the speaker 920. Of course, in further embodiments of the present application in which the media signal includes a video broadcast that is received by the receiver 904, the output 906 may be configured to output the video broadcast as either or both of a video signal to the display 910 and an audio signal to the speaker 920.

The controller 908 of the display system 902 is configured to determine an advertisement for display in correspondence with the media signal. The advertisement may comprise a video for display or an image, or images, for display. The video or image may comprise any type and format of videos or images which are generally known and understood in the art. Moreover, those of ordinary skill in the art appreciate that the advertisement is not limited to being a video or an image. For example, the advertisement may additionally or alternatively comprise a textual or even braille-based advertisement for display.

The controller 908 may determine or receive the advertisement from a memory 922 of the display system 902 or a database (not shown). The memory 922 may be the same or similar to the memory 806 of FIG. 8 or the RAM 235 or ROM 240 of FIG. 2. The database may be the same or similar to the database 245 of FIG. 2. In further embodiments, the controller 908 may determine or receive the advertisement via the receiver 904 of the display system 902. The receiver 904 may determine or receive the advertisement from the same one of the antenna 916 and the satellite 918 from which the media signal is received. Alternatively, the controller 908 may determine or receive the advertisement via any alternative source, such as, for example, any antenna, satellite, or broadcaster from which the media signal is not received.

In embodiments in which the advertisement is determined or received by the controller 908 via the receiver 904, the advertisement may be determined or received at a same time or a different time as the media signal. The advertisement may be automatically determined or received by the controller 908 upon receipt by the receiver 904, or the controller 908 may transmit a request for the advertisement. Of course, the above-described examples are merely exemplary and not limiting or exhaustive.

As discussed above, in embodiments of the display system 902, the controller 908 may automatically receive the advertisement. In other words, the advertisement may be determined independently from the controller 908. In further embodiments of the display system 902, the controller 908 may determine the advertisement itself. In this regard, the controller 908 may determine the advertisement based on the media signal. For example, in an embodiment of the display system 902, the controller 908 may determine the advertisement based on an origin or a signature of the media signal. If the media signal is related to or originates from a particular geographic location or area, the controller 908 may determine the advertisement based on the particular geographic location or area. For example, if the media signal comprises a radio signal which originates from a particular local, the advertisement may be determined based on the local from which the radio signal originates. Additionally or alternatively, if the media signal comprises a radio signal which relates to a particular geographic location or area, the advertisement may be determined based on the geographic location or area to which the radio signal relates.

In further embodiments of the display system 902, the controller 908 may determine the advertisement based on a content of the media signal. The advertisement may be determined in direct correspondence with the content of the media signal. For example, if the media signal is a radio signal which relates to a particular event, contest, or establishment, the advertisement may be determined based on the particular event, contest, or establishment. Additionally or alternatively, the advertisement may be determined indirectly with the content of the media signal. For example, it the media signal is a radio signal which is playing a country song or station, the advertisement may be determined based on demographic information corresponding to the country song or station. That is, the advertisement may relate to specific vehicles, clothing, hunting equipment, or the like which is more likely to appeal to an estimated demographic profile of an individual listening to the country song or station. The demographic profile may be specifically determined based on the content of the radio signal, or generally determined based on the radio station which broadcasts the radio signal. Of course, the above-listed embodiments are merely exemplary, non-limiting, and not exhaustive. The advertisement may be determined by the controller 908 in accordance with any additional or alternative methodologies without departing from the scope of the present application.

In even further embodiments of the display system 902, the controller 908 may determine the advertisement independently of the media signal. For example, the display system 902 or the vehicle 914 may include a sensor 924 which detects a position or location of the display system 902 or the vehicle 914. In this regard, the sensor 924 may comprise a global positioning system (GPS) or other navigation system which is configured to detect the position or the location of the display system 902 or the vehicle 914. The controller 908 may determine the advertisement based solely on a detected position or location of the display system 902 or the vehicle 914.

Additionally or alternatively, the display system 902 or the vehicle 914 may determine the advertisement based on the detected position or location in consideration of additional factors. For example, the controller 908 may determine the advertisement based on the detected location or position and the media signal. Specifically, in the above-discussed embodiment in which the controller 908 may determine demographic information in association the media signal, the controller 908 may determine the advertisement so as to correspond to an establishment which is associated with or which corresponds to the demographic information and which is located within a predetermined distance of the detected location or position of the display system 902 or the vehicle 914.

In further embodiments, the controller 908 may determine the advertisement based on the detected location or position and additional or alternative factors. For example, if a time of day corresponds to a predetermined time or a range of times, such as lunch time, the controller 908 may determine the advertisement so as to correspond to a restaurant which is within located near or located within a predetermined distance of the detected location or the position of the display system 902 or the vehicle 914. Of course, this example is merely exemplary and not limiting or exhaustive. For example, if the controller 908 detects that a certain event or activity is about to or is taking place within a predetermined distance of the detected location or position of the display system 902 or the vehicle 914, such as, for example, a sporting event or a concert, the advertisement may be determined so as to correspond to the event or activity, or any establishment or business associated with the event or activity.

In even further embodiments of the display system 902, the controller 908 may determine the advertisement based on the detected location or position and even further additional or alternative factors. For example, the controller 908 may determine the advertisement based on the detected location or position of the display system 902 or the vehicle 914 and any additional settings or states of the display system 902 or the vehicle 914. If the controller 908 detects that a low fuel light of the vehicle 914 is active or detects that a fuel level of the vehicle is less than a predetermined threshold, the controller 908 may determine the advertisement so as to correspond to a fuel station which is near or within a predetermined area of the detected location or position of the display system 902 or the vehicle 914. If the controller 908 detects that a check engine light of the vehicle 914 is active or any other emergency condition exists, the controller 908 may determine the advertisement so as to correspond to a repair shop or towing service which is near or within a predetermined area of the detected location or position of the display system 902 or the vehicle 914. In a further example, the controller 908 may determine the advertisement based on additional settings or states of the display system 902. In this regard, if the display system 902 includes or is associated with a search function of a navigation system, the controller 908 may determine the advertisement based on the detected location or position of the display system 902 or the vehicle 914 and a searched category, e.g., restaurants.

In even additional embodiments of the display system 902 in which it includes or is associated with a navigation system, the controller 908 may determine the advertisement based on an entered destination of the navigation system. The controller 908 may also determine the advertisement based on any additional settings of the navigation system, such as, but not limited to, a history of the navigation system.

Of course, the above-listed examples are merely exemplary and not limiting or exhaustive. The controller 908 may determine the advertisement in accordance with any combination of the above-features without departing from the scope of the present application. For example, if the controller 908 detects that a destination of a navigation system is more than a predetermined distance away and a time of day is a predetermined time or within a range of times, e.g., at night, the controller 908 may determine the advertisement so as to correspond to a hotel or motel which is closest or within a predetermined distance of a detected location or position of the display system 902 or the vehicle 914. The controller 908 may also determine the advertisement in accordance with any additional or alternative features which are known in the art without departing from the scope of the present application. For example, the controller 908 may determine the advertisement based on predefined or user-set settings. In this regard, the display system 902 may be configured to display advertisements of predetermined types. Once again, these examples are non-limiting and are not exhaustive.

The display 910 of the display system 902 is configured to display the advertisement. The display 910 may be integral with the display system, or the display 910 may comprise an external or remote display. The display 910 may be the same or similar to the display 808 as described with respect to FIG. 8. The advertisement may be displayed on an entire area of the display 910, or the advertisement may be displayed within any one or more areas of the display 910. For example, the display 910 may comprise a split screen in which a map is displayed in one area and the advertisement is displayed in another area. The advertisement may even display within a predetermined area of the map or as a background of the map. The predetermined area of the map may comprise certain types of terrain such as, but not limited to, the sky, a body of water, or land which does not comprise roadways. In further embodiments, the display 910 may comprise a split screen in which a radio, music, or vehicle setting is displayed in one area the advertisement is displayed in another area. Of course, these embodiments are merely exemplary and it is to be understood that the advertisement may be displayed in any particular portion or area of the display 910 without departing from the scope of the present application.

The processor 912 controls a movement within the advertisement during the display of the advertisement on the display 910. The processor 912 may be the same or similar to the processor 804 as described with respect to FIG. 8 or the processor 255 as described with respect to FIG. 2, and shown in more detail by FIG. 3. The processor 912 may identify or determine a feature or object within the advertisement in accordance with the description of FIG. 3 and the teachings herein, and control the movement of the identified or determined feature or object.

In even further embodiments, the processor 912 may identify or determine a feature or object within the advertisement, insert a model feature or object into the advertisement in correspondence with the identified or determined feature, and control a movement of the inserted model feature or object as described in more detail with respect to at least FIG. 3 and FIG. 7. The processor 912 may even determine a part of the inserted model feature or object, and move the part to match a similar part in the identified or determined feature. For example, in the above-discussed automobile advertisement example, where the face of an actor has been extracted by the processor 912, the processor 912 may determine movement of the actor's eyes and lips based on motion vectors provided by the processor 912 and apply similar motion vectors to the inserted model feature or object. Thus, in the automobile advertisement example, an image of a user's face, for example, may be inserted in the advertisement into the original image field such that the user's face will replace the actor's face, including specific gestures, body language, and other attributes. Of course, the above-described examples are merely exemplary and non-limiting. Moreover, the processor 912 may additionally or alternatively employ any of the teachings described with respect to further embodiments set forth herein, such as but not limited to, adjusting a scale, orientation, or display characteristics of the inserted model feature or object.

The processor 912 may determine the inserted model feature or object from the memory 922 of the display system 902, as generally discussed with respect to FIG. 3. Additionally or alternatively, the model feature or object which is to be inserted into the advertisement may be received by the receiver 904 from any of the satellite 918, the antenna 916, or any other transmission or broadcast, as generally discussed with respect to FIG. 1.

The inserted model feature or object may be determined by the processor 912 or received by the receiver 904 in correspondence with a location of the display system 902 or the vehicle 914. The location of the display system 902 or the vehicle 914 may be determined by the sensor 924 of the display system 902 or based on the received media signal. In any event, the model feature or object may be inserted into the advertisement to provide a local or region-specific advertisement, similar to the manner in which the advertisement may be determined. According to such an embodiment, the advertisement itself need not be determined based on the location of the display system 902 or the vehicle 914. Instead, a local model feature or object may be determined based on the location of the display system 902 or the vehicle 914 for insertion into the advertisement.

Further to the above, the processor 912 may control the movement in accordance with a speed of motion determined by the processor 912. The movement may be controlled in accordance with the speed of motion while also being controlled to match similar parts in an inserted model feature or object and an identified or determined feature or object within the advertisement, as described above. Alternatively, the movement may be controlled in accordance with the speed of motion independently from any movement which is controlled to match similar parts in an inserted model feature or object and an identified or determined feature or object within the advertisement, as described above.

The speed of motion which is determined by the processor 912 and by which the movement in the advertisement is controlled may be a vehicular speed of the vehicle 914. In this regard, in the embodiment of FIG. 9 in which the display system 902 is located in the vehicle 914 and includes the sensor 924, the sensor 924 may be configured to detect the vehicular speed of the vehicle 914 as the speed of motion. The sensor 924 may be the same or different from any sensor which detects the location of the display system 902 or the vehicle 914. In this regard, the display system 902 may comprise multiple sensors. The processor 912 may additionally or alternatively receive the vehicular speed from the vehicle 914. The vehicle 914 is shown in FIG. 8 as comprising an automobile. Nevertheless, it should be understood that the vehicle 914 of FIG. 8 is merely exemplary and that the vehicle 914 may comprise alternative concepts in further embodiments of the present application.

In further embodiments of the display system 902, the sensor 924 may additionally or alternatively detect a speed of the display system 902, itself. In this regard, the movement in the advertisement may be controlled in accordance with a speed of the display system 902. Once again, it is to be understood that this embodiment is also merely exemplary and that the speed of motion need not be limited to a speed of the vehicle 914 or a speed of the display system 902.

As generally discussed above, movement in the advertisement, which is controlled in accordance with the speed of motion determined by the processor 912, may be with respect to a feature or part of the advertisement. The feature or part of the advertisement may relate to an item or object within the advertisement. Additionally or alternatively, the feature or part of the advertisement may comprise a display portion of the advertisement, such as a ticker or scrolling portion of the advertisement. In even further embodiments, the movement may relate to the advertisement as a whole. That is, the movement may distinguish advertisement as being a video as opposed to a static image. Moreover, the movement may distinguish the advertisement as being a series of images which are successively displayed as opposed to a single, static image which is displayed. These examples are merely exemplary and are not limiting or exhaustive. In even further embodiments, the movement may relate to additional or alternative aspects of the advertisement.

The processor 912 may control the movement in the advertisement by disabling the movement. Additionally or alternatively, the processor 912 may control the movement in the advertisement by increasing a speed of the movement, or by decreasing a speed of the movement. In even further embodiments of the display system 902, the processor may control the movement in accordance with even further additional or alternative means, such as, for example, by confining the movement within certain regions of the advertisement or by limiting or broadening a scope or displacement of the movement. For example, in accordance with the above-exemplary embodiments in which the movement of a bell or other object is controlled in the advertisement, the processor 912 may disable movement of the bell, control a speed with which the bell rings, control a displacement over which the bell rings, and/or confine the bell to ringing within a certain region of the advertisement. Of course, these embodiments are merely exemplary and the processor 912 may control the movement in accordance with additional or alternative methods without departing from the scope of the present application.

The processor 912 may control the movement within the advertisement in accordance with a magnitude of the determined speed of motion. The processor 912 may decrease or increase a speed of the movement within the advertisement during the display of the advertisement in response to a magnitude of the speed of motion being increased or decreased, respectively. Alternatively, the processor may increase or decrease a speed of the movement within the advertisement during the display of the advertisement in response to a magnitude of the speed of motion being increased or decreased, respectively. In this regard, the processor 912 may control the movement such that it is directly proportional to the magnitude of the speed of motion, or inversely proportional to the speed of motion.

The processor 912 may additionally or alternatively control the movement within the advertisement in accordance with either or both of a predetermined minimum limit and a predetermined maximum limit. For example, the processor 912 may increase the movement within the advertisement proportionally to the magnitude of the speed of motion up to the predetermined maximum limit, whereupon the processor 912 may disable the movement within the advertisement in response to the magnitude of the speed of motion exceeding the predetermined maximum limit. Either or both of the predetermined minimum limit and the predetermined maximum limit may correspond to a magnitude greater than zero, a speed limit of a road on which the vehicle 914 is traveling, a magnitude in excess or below the speed limit of the road, a governmental warning or regulation, or any other predefined, preset, or other number.

With respect to the embodiments in which the processor 912 disables the movement in the advertisement, the controller 908 may determines or receive a first advertisement that includes motion and a second advertisement that does not include motion or is static. The processor 912 may cause the first advertisement which includes the motion to be displayed on the display 910 when the movement is not disabled, and the processor 912 may cause the second advertisement which does not include the motion to be displayed on the display 910 when the movement is to be disabled. The processor 912 may select from among the first and second advertisements based on the speed of motion of the vehicle 914, or based upon any of the other various criteria described herein. Of course, the processor 912 is not limited to disabling the movement by selecting between the first and second advertisements. For example, in another limiting and exemplary embodiment, the processor 912 may simply pause or show a single frame of an advertisement for disabling the movement.

In addition to the features described above, or as an alternative thereto, the processor 912 may detect a location of the display system 902 or the vehicle 914. The processor 912 may detect the location of the display system 902 or the vehicle 914 using the sensor 924, or in accordance with any other method disclosed herein. The processor 912 may additionally or alternatively control the movement within the advertisement during the display of the advertisement in correspondence with the location of the display system 902 or the vehicle 914. That is, the processor 914 may control the movement in accordance with the speed of motion and the location, either individually or collectively.

The processor 912 may control the movement within the advertisement by increasing a speed, decreasing a speed, disabling, enabling, or otherwise controlling an aspect of the movement in accordance with any one or plural conditions. For example, the processor 912 may control the movement within the advertisement in response to a predetermined object being within a predetermined distance of the location of the display system 902 or in response to the location of the display system 902 or the vehicle 914 being within a predetermined area. The predetermined object or area may comprise a toll booth or toll plaza, a police station, a school or school zone, a construction zone, an emergency vehicle, an accident, a safety corridor, a type of road, or a specific speed limit. In this regard, the processor 902 may, for example, disable or decrease a speed of movement within the advertisement in response to the display system 902 or the vehicle 914 being within the predetermined distance of such exemplary objects and areas. According to such a feature, the display system 902 may enhance safety in and around predetermined objects and areas by minimizing any distractions.

In further embodiments, the processor may enable or increase a speed of movement within the advertisement in response to a predetermined object being within a predetermined distance of the location of the display system 902 the vehicle 914 or in response the location of the display system 902 or the vehicle 914 being within a predetermined area. Such objects and areas may include, but are not limited to, a destination of the vehicle 914, an emergency zone, another vehicle, or any of the above-listed exemplary objects and area. According to such a feature, the display system 902 may enhance safety in and around predetermined objects and areas by increasing awareness.

As discussed above, the display system 902 may comprise a memory 922 which stores the advertisements. The memory 922 may store the advertisements for display purposes. Additionally or alternatively, the memory 922 may store selected or desired advertisements for later viewing. The display 910 may be configured to display any advertisements which are stored in the memory 922 at a later time in response to the advertisements being stored in the memory 922. For example, the display system 902 may be configured to receive an input, such as via the display 910, whereupon the memory 922 stores a displayed advertisement. The received input may comprise a touched position being received during the display of the advertisement which corresponds to a display position of the advertisement. Of course, additional or alternative means of selecting a displayed advertisement may be utilized without departing from the scope of the present application. Thereafter, the stored advertisement may be configured to be automatically re-displayed by the controller 908, or configured to be displayed upon request.

In the embodiment in which the display system 902 is configured to receive an input, the display may be further configured to receive a same or additional input which corresponds to the advertisement during the display of the advertisement. In response to such input, the controller 908 may be configured to display additional information about the advertisement. According to such a feature, additional information may be provided regarding a particularly appealing or interesting advertisement. Additionally or alternatively, the controller 908 or processor 912 may also be configured to freeze or pause the display in response to the input, or an additional input, being received. According to such a feature, safety and focus may be enhanced by enabling a particularly appealing or interesting advertisement to be viewed at a later time and in more detail.

Figure 10:
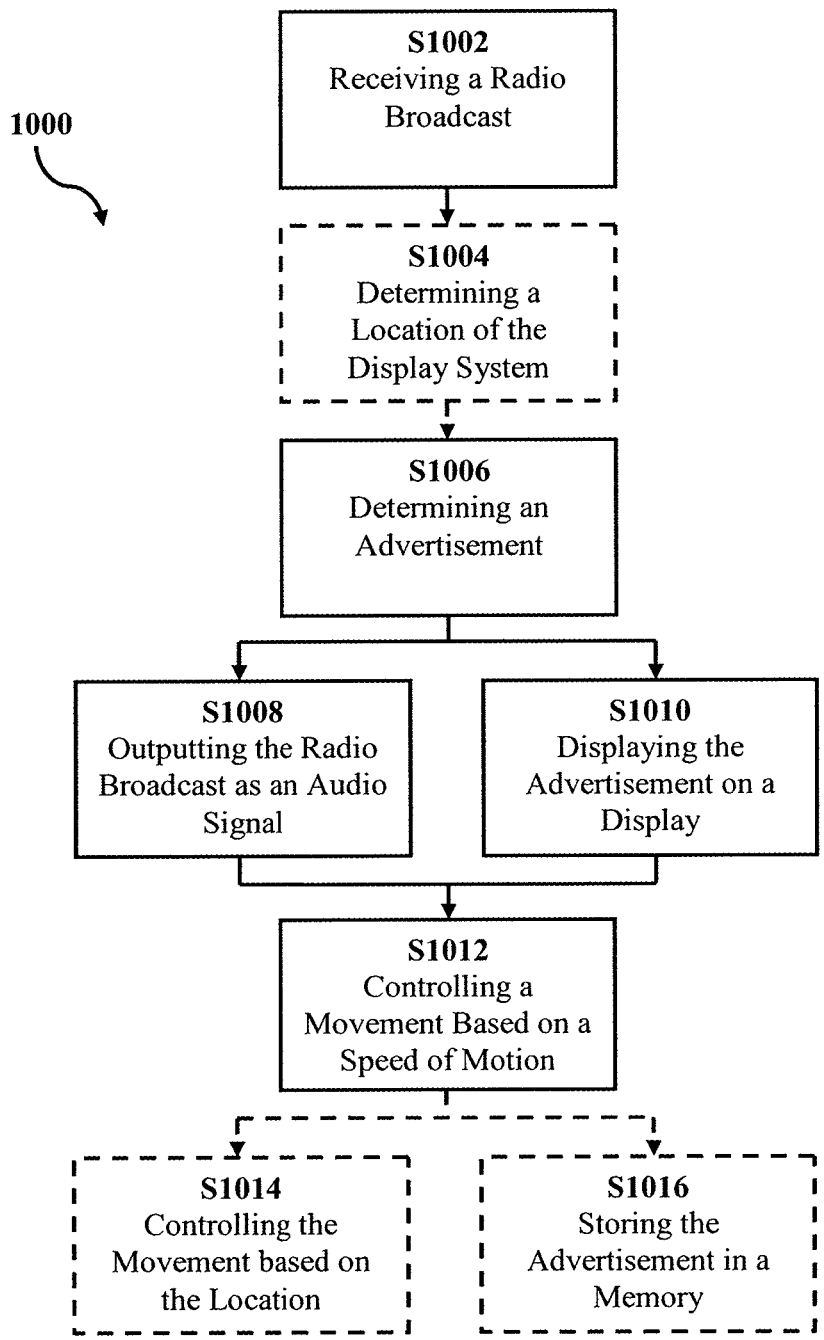
FIG. 10 is a flow diagram of an exemplary process for an advertising system, according to an aspect of the present invention.

The present disclosure further provides various methods for displaying and controlling the display of advertisements. Those skilled in the art appreciate, of course, that the various methods may be implemented in accordance with the teachings and disclosure discussed above. FIG. 10 discloses an exemplary method for displaying and controlling an advertisement.

According to the method 1000 of FIG. 10, a radio broadcast is received by a display system of a vehicle at S1002. The radio broadcast may be received via an antenna, a satellite, or any other known and understood means. At S1004, a location of the display system or the vehicle may be determined. The location may be determined, for example, via a navigation system. An advertisement is determined in correspondence with the radio broadcast at S1006. The advertisement may be determined internally by a processor of the display system or the vehicle or received externally, for example, via the antenna or the satellite. The advertisement may further be determined in correspondence with the location of the display system or the vehicle which may be determined in S1004.

The radio broadcast is output as an audio signal at S1008, and the advertisement is displayed in correspondence with the audio signal at S1010. The audio signal may be output to one or more speakers, and the advertisement may be displayed on a monitor of the display system or the vehicle. During the output of the audio signal and the display of the advertisement, a processor of the display system controls a movement within the advertisement during the display of the advertisement at S1012. The movement is controlled by the processor in accordance with a speed of motion of the display system or the vehicle which is determined by the processor. The movement may also be controlled by the processor based on the location, which may be determined in S1004, at S1014. The displayed advertisement may be stored in a memory in response to a user input at S1016.

Of course, those skilled in the art appreciate that the above-described method 1000 is merely exemplary and that the present disclosure includes various additional and alternative methods in accordance with the teachings and disclosure set forth herein. Moreover, those of ordinary skill in the art understand the various processes and methods described herein may be implemented by various computer programs and computer-readable media including executable instructions. The computer programs and computer-readable media, when executed, may implement any of the various processes, methods, or combinations thereof disclosed herein.

Accordingly, the present disclosure provides various systems, servers, methods, media, and programs for providing an information exchange session. Although the present application has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A display system, comprising:
   a radio broadcast receiver that receives a radio broadcast;
   an audio output that outputs the radio broadcast as an audio signal;
   a display controller that determines an advertisement for display in correspondence with the audio signal;
   a display that is configured to display the advertisement; and
   a processor that controls a movement within the advertisement during the display of the advertisement on the display, the movement being controlled in accordance with a speed of motion determined by the processor,
   wherein the processor increases a speed of the movement within the advertisement during the display of the advertisement in response to a magnitude of the speed of motion being increased.

2. The display system according to claim 1, wherein the processor disables the movement within the advertisement during the display of the advertisement in response to determining that the magnitude of the speed of motion exceeds a predetermined limit.

3. The display system according to claim 1, wherein
the display controller determines, as the advertisement, a first advertisement that includes motion and a second advertisement that is static,
the processor selects between the first advertisement and the second advertisement based on the speed of motion for controlling the movement within the advertisement in accordance with the speed of motion, and
the processor increases the speed of the movement within the first advertisement.

4. The display system according to claim 1, wherein the processor decreases the speed of the movement within the advertisement during the display of the advertisement in response to the magnitude of the speed of motion being increased.

5. The display system according to claim 1, further comprising:
a sensor that detects a location of the display system,
wherein the processor further controls the movement within the advertisement during the display of the advertisement in correspondence with the location of the display system.

6. The display system according to claim 5, wherein the processor changes the speed of the movement within the advertisement during the display of the advertisement in response to a predetermined object being within a predetermined distance of the location of the display system.

7. The display system according to claim 5, wherein the processor changes the speed of the movement within the advertisement during the display of the advertisement in response to the location of the display system being within a predetermined area.

8. The display system according to claim 1, further comprising:
a sensor that detects a location of the display system, wherein
the display controller determines the advertisement for display in correspondence with the location of the display system.

9. The display system according to claim 1, further comprising:
a memory that stores the advertisement in response to an input which corresponds to the advertisement being received during the display of the advertisement,
wherein the display is configured to display the advertisement at a later time in response to the advertisement being stored in the memory.

10. The display system according to claim 1, wherein
the display is configured to receive an input which corresponds to the advertisement during the display of the advertisement, and
the display controller is configured to display additional information about the advertisement in response to the display receiving the input which corresponds to the advertisement during the display of the advertisement.

11. The display system according to claim 1, wherein
the processor determines a first object within the advertisement, and
the processor inserts a second object into the advertisement in correspondence with the first object, the movement being of the second object.

12. The display system according to claim 11, further comprising:
a sensor that detects a location of the display system,
wherein the second object is determined based on the location of the display system.

13. The display system according to claim 1, wherein the radio broadcast receiver further receives the advertisement.

14. The display system according to claim 1, further comprising:
a sensor for detecting the speed of motion with which the processor controls the movement within the advertisement during the display of the advertisement.

15. The display system according to claim 1, wherein
the display system is located within a vehicle, and
the processor determines a vehicular speed as the speed of motion for controlling the movement within the advertisement in accordance with the speed of motion.

16. A method for displaying an advertisement on a display system, the method comprising:
receiving a radio broadcast;
outputting the radio broadcast as an audio signal;
determining an advertisement for display in correspondence with the audio signal;
displaying the advertisement on a display in correspondence with the audio signal; and
controlling, with a processor, a movement within the advertisement during the display of the advertisement on the display, the movement being controlled in accordance with a speed of motion determined by the processor,
wherein the processor increases a speed of the movement within the advertisement during the display of the advertisement in response to a magnitude of the speed of motion being increased.

17. The method according to claim 16, wherein
the advertisement is determined as a first advertisement that includes motion and a second advertisement that is static,
the processor selects between the first advertisement and the second advertisement based on the speed of motion for controlling the movement within the advertisement in accordance with the speed of motion, and
the processor increases the speed of the movement within the first advertisement.

18. A non-transitory computer-readable medium encoded with an executable computer program for displaying an advertisement on a display system that, when executed by a processor, causes the processor to perform operations comprising:
receiving a radio broadcast;
outputting the radio broadcast as an audio signal;
determining an advertisement for display in correspondence with the audio signal;
displaying the advertisement on a display in correspondence with the audio signal; and
controlling a movement within the advertisement during the display of the advertisement on the display, the movement being controlled in accordance with a speed of motion determined by the processor,
wherein the processor increases a speed of the movement within the advertisement during the display of the advertisement in response to a magnitude of the speed of motion being increased.

19. The non-transitory computer-readable medium according to claim 17, wherein
the advertisement is determined as a first advertisement that includes motion and a second advertisement that is static,
the processor selects between the first advertisement and the second advertisement based on the speed of motion for controlling the movement within the advertisement in accordance with the speed of motion, and the processor increases the speed of the movement within the first advertisement.

20. A display system, comprising:

a radio broadcast receiver that receives a radio broadcast;

an audio output that outputs the radio broadcast as an audio signal;

a display controller that determines an advertisement for display in correspondence with the audio signal;

a display that is configured to display the advertisement; and a processor that controls a movement within the advertisement during the display of the advertisement on the display, the movement being controlled in accordance with a speed of motion determined by the processor, wherein the processor determines a first object within the advertisement, and the processor inserts a second object into the advertisement in correspondence with the first object, the movement being of the second object.

* * * * *